(12) United States Patent
Silverstein et al.

(10) Patent No.: US 7,403,180 B1
(45) Date of Patent: Jul. 22, 2008

(54) HYBRID COLOR SYNTHESIS FOR MULTISTATE REFLECTIVE MODULATOR DISPLAYS

(75) Inventors: Louis D. Silverstein, Scottsdale, AZ (US); Alan G. Lewis, Sunnyvale, CA (US); Jennifer Lee Gille, Menlo Park, CA (US); Gang Xu, Cupertino, CA (US)

(73) Assignee: Qualcomm Mems Technologies, Inc., San Diego, IL (US)

( * ) Notice: Subject to any disclaimer, the term of this patent is extended or adjusted under 35 U.S.C. 154(b) by 0 days.

(21) Appl. No.: 11/699,542

(22) Filed: Jan. 29, 2007

(51) Int. Cl.
G09G 3/34 (2006.01)
G02B 26/00 (2006.01)

(52) U.S. Cl. .............. 345/84; 345/55; 345/85; 359/290; 359/291; 385/146

(58) Field of Classification Search .............. 385/24, 385/146–147; 359/290, 291; 345/55, 84, 345/85
See application file for complete search history.

(56) References Cited

U.S. PATENT DOCUMENTS

| | | | |
|---|---|---|---|
| 5,032,007 | A | 7/1991 | Silverstein et al. |
| 5,638,084 | A | 6/1997 | Kalt |
| 5,818,095 | A | 10/1998 | Sampsell |
| 5,835,256 | A | 11/1998 | Huibers |
| 5,933,183 | A | 8/1999 | Enomoto et al. |
| 5,959,777 | A | 9/1999 | Whitehead |
| 5,986,796 | A | 11/1999 | Miles |
| 6,040,937 | A | 3/2000 | Miles |
| 6,674,562 | B1 | 1/2004 | Miles et al. |
| 7,123,216 | B1 | 10/2006 | Miles |
| 7,126,738 | B2 | 10/2006 | Miles |
| 7,184,202 | B2 | 2/2007 | Miles et al. |
| 7,236,284 | B2 | 6/2007 | Miles |

(Continued)

FOREIGN PATENT DOCUMENTS

JP 2002-062490 2/2000

(Continued)

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

(Continued)

*Primary Examiner*—Hemang Sanghavi
(74) *Attorney, Agent, or Firm*—Knobbe, Martens, Olson & Bear, LLP

(57) ABSTRACT

A display device including a plurality of optical modulators and a plurality of filter elements on a reflective side of the plurality of optical modulators is provided. The plurality of optical modulators includes a first set of optical modulators and a second set of optical modulators. Each optical modulator of the plurality of optical modulators is configured to be selectively switched among at least a first state, a second state, and a third state. Each state has a different spectral reflectance. The plurality of filter elements includes a first set of filter elements corresponding to the first set of optical modulators and a second set of filter elements corresponding to the second set of optical modulators. The first set of filter elements has a different spectral transmittance than the second set of filter elements.

32 Claims, 20 Drawing Sheets

U.S. PATENT DOCUMENTS

| | | | |
|---|---|---|---|
| 2002/0139981 A1 | 10/2002 | Young | |
| 2005/0002082 A1 | 1/2005 | Miles | |
| 2006/0065940 A1 | 3/2006 | Kothari | |
| 2006/0066935 A1 | 3/2006 | Cummings et al. | |
| 2006/0077155 A1 | 4/2006 | Chui et al. | |
| 2006/0077508 A1 | 4/2006 | Chui et al. | |
| 2006/0077515 A1 | 4/2006 | Cummings | |
| 2007/0205969 A1* | 9/2007 | Hagood et al. | 345/84 |
| 2007/0268201 A1 | 11/2007 | Sampsell et al. | |
| 2007/0268211 A1* | 11/2007 | Whitehead et al. | 345/55 |

FOREIGN PATENT DOCUMENTS

| | | |
|---|---|---|
| WO | WO 2004/032523 A1 | 4/2005 |

OTHER PUBLICATIONS

Aratani K., et al., "Surface micromachined tuneable interferometer array," Sensors and Actuators, pp. 17-23. (1994).

L. Silverstein, "STColor: Hybrid Spatial-Temporal Color Synthesis for Enhanced Display Image Quality," Society for Information Display Technical Digest (2005), pp. 1112-1115.

L. Silverstein et al., "Hybrid spatial-temporal color synthesis and its applications," Journal of the Society for Information Display 14/1 (2006), pp. 3-13.

L. Silverstein, "Color and Displays in the Space-Time Continuum," Information Display, 21 (2005), pp. 21-27.

* cited by examiner

|  | Column Output Signals | |
|---|---|---|
|  | $+V_{bias}$ | $-V_{bias}$ |
| Row Output Signals 0 | Stable | Stable |
| $+\Delta V$ | Relax | Actuate |
| $-\Delta V$ | Actuate | Relax |

HYBRID COLOR SYNTHESIS FOR MULTISTATE REFLECTIVE MODULATOR DISPLAYS

BACKGROUND

1. Field

The field of the invention relates to microelectromechanical systems (MEMS), and more particularly to displays comprising MEMS.

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In certain embodiments, a display device comprises a plurality of optical modulators and a plurality of filter elements on a reflective side of the plurality of optical modulators. The plurality of optical modulators comprises a first set of optical modulators and a second set of optical modulators. Each optical modulator of the plurality of optical modulators is configured to be selectively switched among at least a first state, a second state, and a third state. Each state has a different spectral reflectance. The plurality of filter elements comprises a first set of filter elements corresponding to the first set of optical modulators and a second set of filter elements corresponding to the second set of optical modulators. The first set of filter elements has a different spectral transmittance than the second set of filter elements.

In certain embodiments, a display device comprises first means for optically modulating light between at least a first color, a second color, and a third color, second means for optically modulating light between the first color, the second color, and the third color, first means for filtering light modulated by the first modulating means, and second means for filtering light modulated by the second modulating means. The first filtering means has a different spectral transmittance than the second filtering means.

In certain embodiments, a method of generating an image comprises providing a display device comprising a plurality of optical modulators and a filter on a reflective side of the plurality of optical modulators. The plurality of optical modulators comprises a first set of optical modulators and a second set of optical modulators. Each optical modulator of the plurality of optical modulators is configured to be selectively switched among at least a first state, a second state, and a third state. Each state has a different spectral reflectance. The filter comprises a first set of filter elements corresponding to the first set of optical modulators and a second set of filter elements corresponding to the second set of optical modulators. The first set of filter elements has a different spectral transmittance than the second set of filter elements. The method further comprises directing light from a light source onto the display device and selectively switching the plurality of optical modulators between the states.

In certain embodiments, a method of manufacturing a display device comprises forming a plurality of optical modulators and forming a plurality of filter elements on a reflective side of the plurality of optical modulators. The plurality of optical modulators comprises a first set of optical modulators and a second set of optical modulators. Each optical modulator of the plurality of optical modulators is configured to be selectively switched among at least a first state, a second state, and a third state. Each state has a different spectral reflectance. The plurality of filter elements comprises a first set of filter elements corresponding to the first set of optical modulators and a second set of filter elements corresponding to the second set of optical modulators. The first set of filter elements has a different spectral transmittance than the second set of filter elements.

DETAILED DESCRIPTION OF THE PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Apparatuses are provided that can render color images from three primary colors using two optical modulators by employing hybrid spatial-temporal color synthesis. Each optical modulator can produce three spectral reflectances and is paired with a filter element to produce one or two primary colors. A color pixel can produce three primary colors by comprising an optical modulator and filter element that produces one primary color paired with an optical modulator and filter element that produces two other primary colors. Such an approach reduces the number of optical modulators (or "subpixels") within a pixel from three to two, which can increase resolution and reduce fixed-pattern noise while maintaining the same number of column drivers as a conventional RGB display. Alternatively, the number of column drivers may be reduced while maintaining the same resolution as a conventional RGB display. In some embodiments, the size of the optical modulators and their corresponding filter elements may be optimized to account for the luminance of different primary colors. In embodiments in which the optical modulators comprise interferometric modulators rather than narrowband illuminants, blanking fields are advantageously eliminated, which can increases bandwidth. Projection devices comprising such modulators and filters may advantageously eliminate a color wheel because the optical modulators can perform color separation. Methods of generating an image using such apparatuses are also provided.

Figure 1:
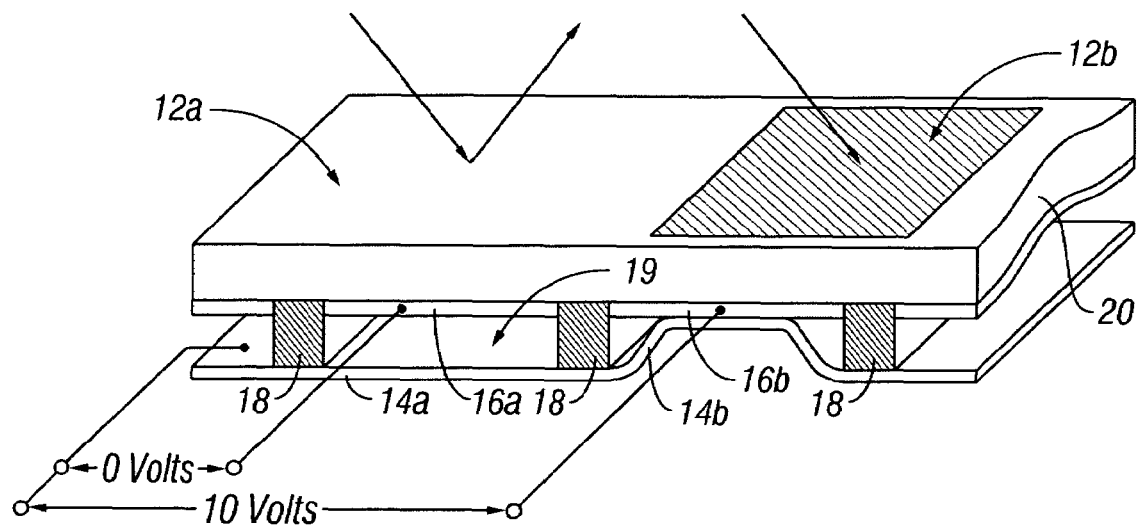
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
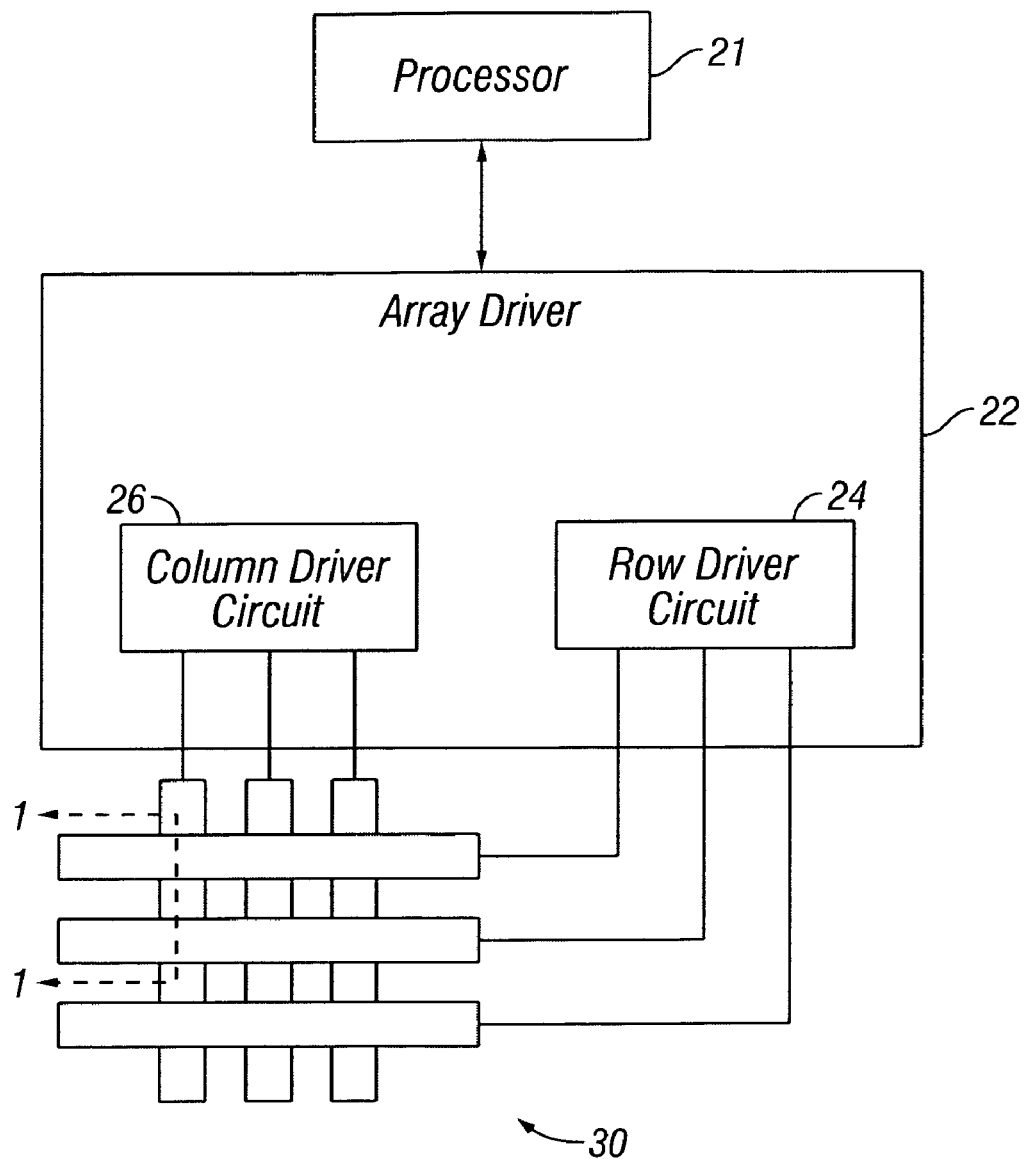
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
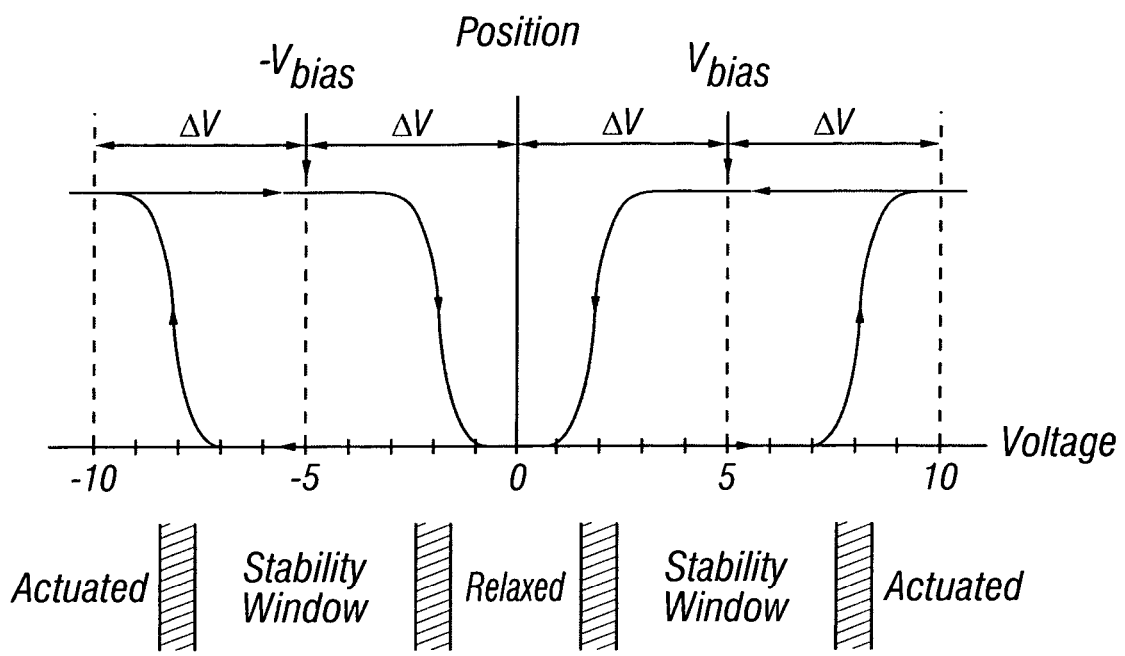
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
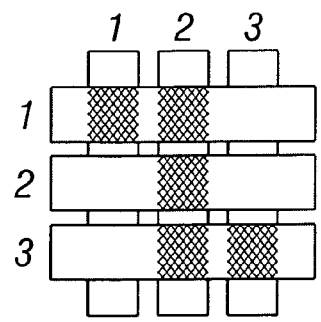
FIG. 5A illustrates one exemplary frame of display data in the 3×3 interferometric modulator display of FIG. 2.
Figure 5B:
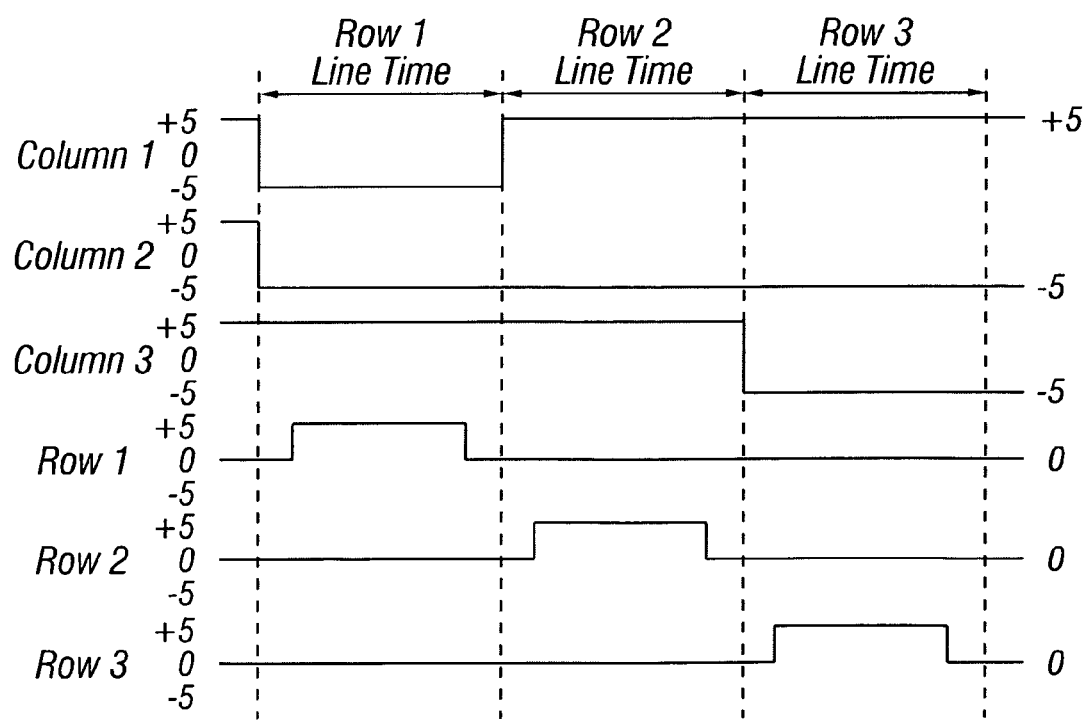
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
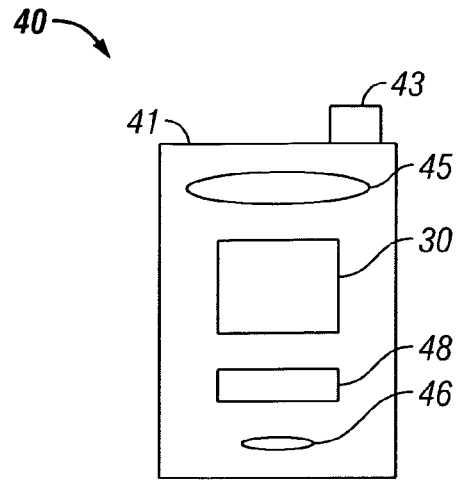
FIGS. 6A and 6B are system block diagrams illustrating an embodiment of a visual display device comprising a plurality of interferometric modulators.
Figure 6B:
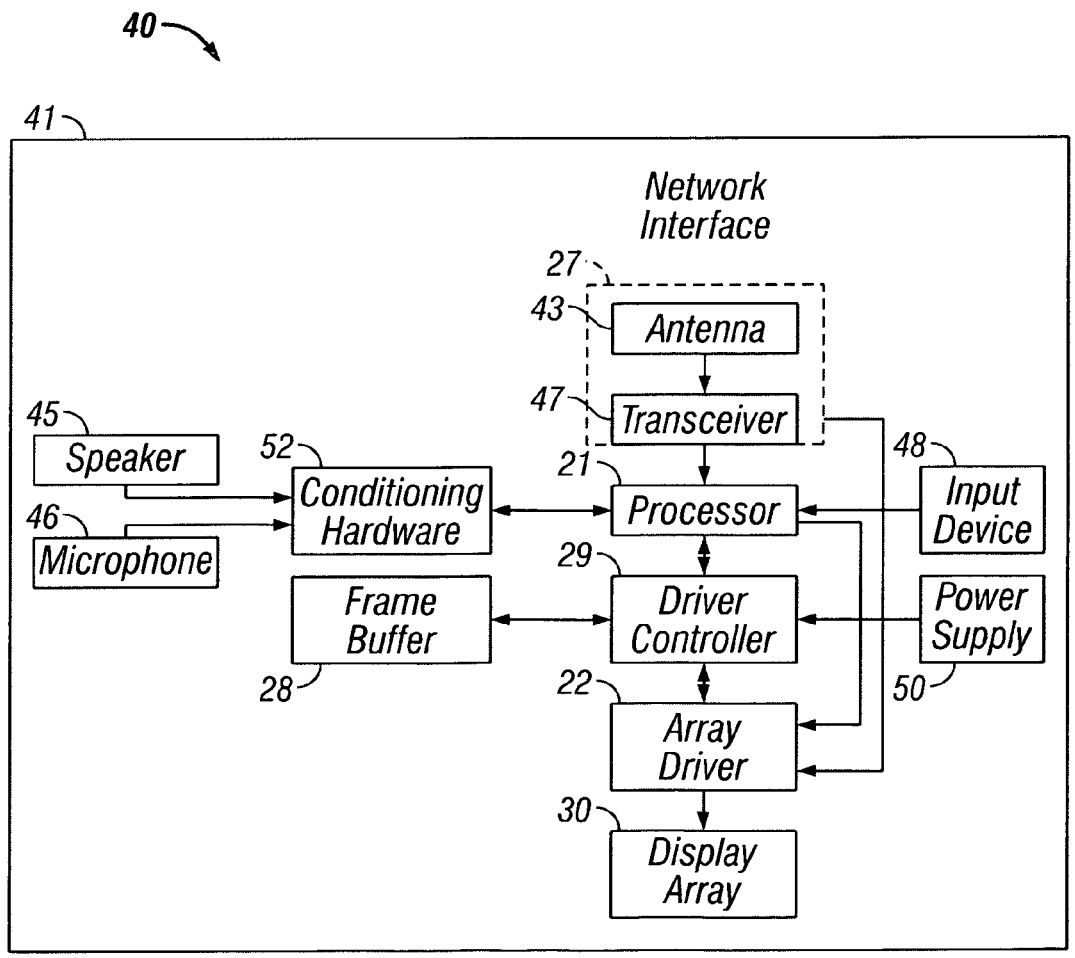

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
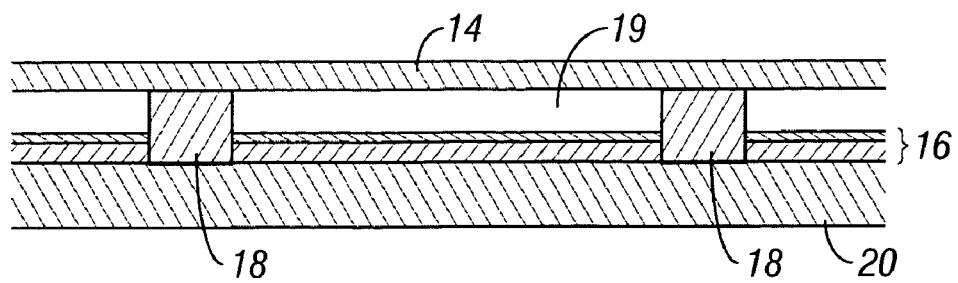
FIG. 7A is a cross section of the device of FIG. 1.
Figure 7B:
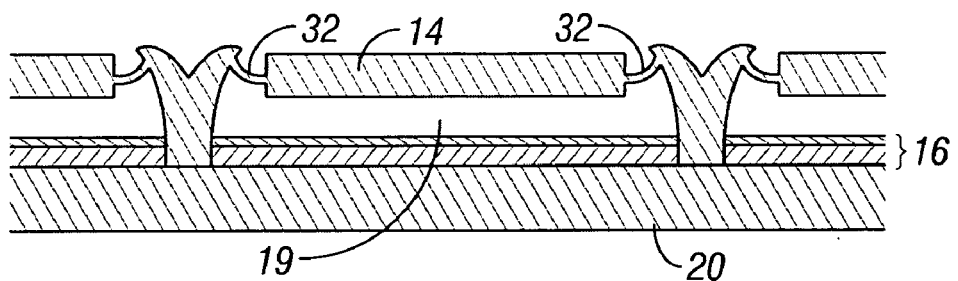
FIG. 7B is a cross section of an alternative embodiment of an interferometric modulator.
Figure 7C:
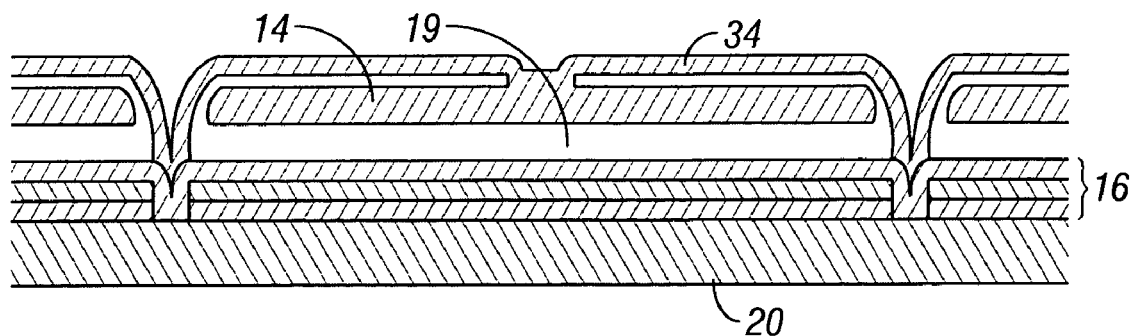
FIG. 7C is a cross section of another alternative embodiment of an interferometric modulator.
Figure 7D:
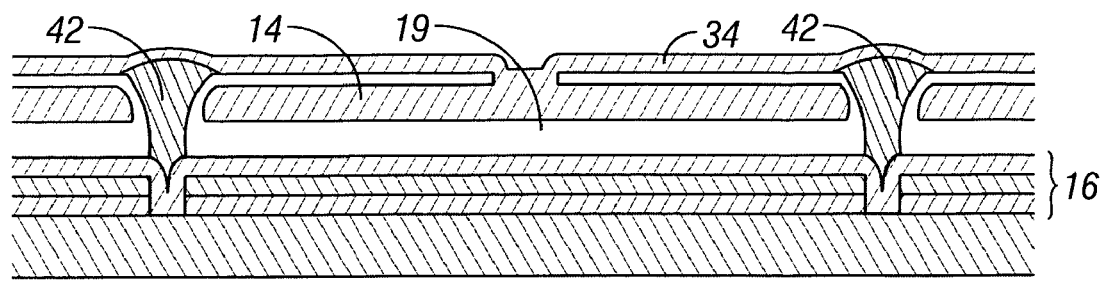
FIG. 7D is a cross section of yet another alternative embodiment of an interferometric modulator.
Figure 7E:
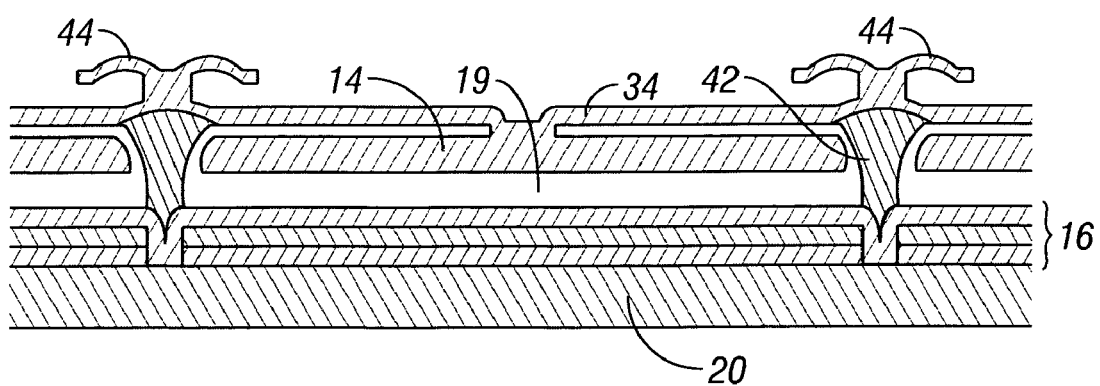
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

A common problem for all color displays, regardless of whether they are of the self-luminous type or the non-self-luminous type, is the synthesis of a full-color image from a limited set of primary colors. Several approaches to color synthesis have traditionally been employed for electronic displays. The most successful of these conform to the principles of additive color mixture and include optical superposition, spatial color synthesis, and temporal color synthesis.

Direct optical superposition of three primary color images is an effective and commonly used method in projection display systems, but is not readily amenable to most direct-view color display technologies. Spatial color synthesis has by far been the most successful method of color synthesis and remains the foundation of modern color display technology in devices like cathode ray tubes (CRT) and liquid crystal displays (LCD). Spatial color synthesis mixes sub-pixels of three or more primary colors (typically red (R), green (G), and blue (B)) in close proximity to generate a full spectrum. However, spatial color synthesis has two significant limitations that reduce image quality and display efficiency.

First, potential display resolution is sacrificed because the use of available spatial area for color synthesis reduces the spatial imaging potential of the display. Spatial color synthesis requires high sub-pixel density because the primary color elements must be encompassed within spatial integration zones of the human visual system (HVS). If the elements (e.g., sub-pixels) are too large, complete color synthesis will fail and color fringes will be apparent in the image. As such, the use of available spatial area for color synthesis reduces the spatial imaging potential for the display. In general, the use of RGB spatial mosaics to synthesize a full-color gamut results in a sacrifice of approximately ⅔ of the resolution potential of the display to color synthesis. Display area allocated to blue sub-pixels is especially wasteful since blue sub-pixels contribute little to luminance and short-wavelengths are processed only at a very low spatial resolution by the HVS.

Second, the mosaic of primary color sub-pixels, particularly due to blue sub-pixel elements, produces fixed-pattern noise. Principal sources of high fixed-pattern noise in some mosaics are low-luminance blue sub-pixels (or blue stripes in the case of commonly-used stripe mosaics), which typically account for only about 8% of the luminance of a displayed white field and therefore appear as dark regions in a relatively bright surrounding. If the green, red, and blue sub-pixel regions have the same radiance in the visible spectrum, then the green regions will appear the brightest of the three because the HVS luminous efficiency function peaks in the green region of the spectrum. Similarly, due to the HVS luminous efficiency, the red regions will appear less bright and the blue regions will exhibit an even further reduction in brightness. If luminance is computed from weighted values of R, G, and B, the weighting coefficient for G will be large (e.g., between about 0.55 and 0.8), the weighting coefficient for R will be intermediate (e.g., between about 0.15 and 0.35), and the weighting coefficient for B will be small (e.g., between about 0.05 and 0.15).

Temporal color (or "frame-sequential" or "field-sequential") synthesis avoids the loss of spatial resolution inherent to spatial color synthesis and does not produce fixed-pattern noise. Unlike spatial color synthesis, temporal color synthesis does not rely on the integration of spatially separated primary color sub-pixels. Instead, primary color pixels are imaged sequentially in time at the same retinal position and temporally integrated to synthesize a full-color spectrum (assuming no positional shifts due to eye and/or head movements). This temporal color approach may be accomplished in various ways, including the sequential activation of R, G, and B emissive sources or the passing broadband light through three primary color filters (e.g., R, G, and B or yellow (Y), cyan (C), and magenta (M)) that can be selectively activated. Because the primary color components are all imaged to the same spatial location and there is no spatial mosaic, temporal color synthesis advantageously avoids the loss of spatial resolution. Additionally, since there is no mosaic, temporal color synthesis advantageously does not produce fixed-pattern noise. However, two important limitations of temporal color synthesis constrain the efficacy of displays employing temporal color synthesis.

First, although temporal color synthesis produces effective additive color mixtures, luminance differences between time-varying components can produce observable luminance flicker. Because the individual primary colors' fields are only present for one third of the total display viewing period, temporal color synthesis displays require a high system bandwidth in order to produce a full-color image at a refresh rate high enough to minimize observable flicker. Even with high system bandwidths and full-color frame refresh rates equivalent to monochromatic or spatial color synthesis displays (i.e., color field rates of three times the refresh rates of spatial color synthesis displays), temporal color synthesis displays are still prone to image flicker due to the residual luminance modulation existing between sequential color image fields.

Second, an even more difficult limitation results from relative movement between the displayed image and the viewer's retina, whether the motion arises from the image or from the viewer's head and/or eye movements. In either case, the time-varying color components are no longer imaged on the same retinal region, and the observer experiences what has come to be known as "color break-up" or "the rainbow effect." Avoiding color break-up for RGB temporal color synthesis displays in the presence of large, high-velocity saccadic eye movements generally requires refresh frequencies well in excess of those needed to avoid flicker, which typically entail color field rates in the range of 360 to 480 fields per second, and can easily exceed 1,000 fields per second when the display luminance and contrast are high. These high field rates impose severe bandwidth limitations on temporal color synthesis displays, as well as their drive electronics, and make the temporal isolation of primary color image fields very difficult.

Image quality has been a driving force behind the evolution of display technology. In all major market segments, the momentum toward higher display resolution and enhanced color quality is inescapable. In turn, this has exposed the limitations of both spatial color synthesis and temporal color synthesis, and raises the question as to whether either method for synthesizing color can alone fully satisfy the ever-increasing demands on display image quality. New approaches to color synthesis may sustain the evolution of display technology.

Recognizing the limitations of traditional methods for synthesizing color in electronic displays, a new hybrid spatial-temporal method has recently been proposed which distributes the color synthesis function across both the spatial and temporal domains. One embodiment of this method has been proposed for transmissive LCDs. Hybrid spatial-temporal color synthesis distributes the color synthesis function across both the spatial and temporal domains. The general approach reduces the number of primary color sub-pixels from three to two and produces the third primary color by temporal synthesis. Two temporally alternating illuminants with different spectral power distributions are typically used, and emit light at through both of the two sub-pixels, each having a different corresponding color selection filter. For example, yellow and blue illuminants may be combined with an LCD panel having a mosaic of magenta and cyan color filters. When the yellow illuminant is turned on during one temporal field, the display output in an activated cyan sub-pixel will be green because the cyan color filter transmits the green segment of the yellow spectral light distribution and the display output in an activated magenta sub-pixel will be red because the magenta color filter transmits the red segment of the yellow spectral light distribution. When the blue illuminant is turned on during an adjacent temporal field, the display output in activated cyan and magenta sub-pixels will be blue because both the cyan and magenta color filters transmit the same short-wavelength spectral region of the blue illuminant.

Hybrid spatial-temporal color synthesis can provide an effective spatial resolution increase of up to three times along the horizontal and vertical dimensions, along with vanishingly low levels of fixed-pattern noise, when using the same number of horizontal sub-pixels and column drivers as a full-color display utilizing an RGB vertical stripe pixel mosaic and spatial color synthesis. Alternatively, hybrid spatial-temporal color synthesis can be used with reduced pixel density and column drivers to provide comparable levels of effective resolution. Such an approach can retain reduced levels of fixed-pattern noise and can provide improved display efficiency (via increased pixel aperture ratios) while potentially reducing costs. However, a major drawback to using hybrid spatial-temporal color synthesis for LCDs is the simultaneous illumination of all sub-pixels by each illuminant in each field.

In order to produce some colors in LCDs, it is necessary to write a blanking field between one temporal field and second adjacent temporal field. For example, creating cyan from red, green, and blue is usually accomplished by combining green and blue. In order to create green and blue in the above example LCD, the yellow illuminant would be turned on, thereby creating green in an activated cyan sub-pixel, then a blanking field would be written to ensure that no residual green remained in the sub-pixel. The blue illuminant would then be turned on, thereby creating blue in an activated cyan sub-pixel. The temporal combination of green and blue within the same pixel creates cyan in an observer's eyes. A second blanking field would be written before the next color is created in order to ensure that no residual blue remained in the sub-pixel. These blanking fields take time, and thus reduce the throughput of LCDs. A LCD with blanking fields requires increased frequencies to create sequential colors in the same period, again imposing severe bandwidth requirements and/or flicker. Moreover, the power provided to the LCD light sources during the non-blanking fields is typically increased to compensate for the lack of light being emitted during the blanking fields, disadvantageously increasing the LCD's power consumption.

Interferometric modulator technology poses unique challenges for generating full-color displays (i.e., displays in which three or more primary colors render color images). These challenges arise from the following operational characteristics: the device is a reflective spatial light modulator with constraints on the reflectance spectrum at each sub-pixel element; the spatial structure and density of the sub-pixel array are limited by design rules and timing-based addressing limits; the bi-stable and binary nature of pixel operation generally utilizes the synthesis of gray-scale levels via spatial and/or temporal color synthesis; and high pixel density interferometric modulator devices will likely be limited to relatively low temporal frame rates due to fundamental operational constraints and the need for high levels of synthesis for both grayscale and color.

Along with the unique challenges posed by the interferometric modulator technology for full-color displays are great opportunities offered by the unique modes of operation of the device. In particular, the capability to switch between two or more spectral reflectance functions at a sub-pixel level provides significant flexibility in methods of color synthesis for full-color interferometric modulator displays.

Embodiments of interferometric modulators described herein operate in one or more reflective states and a non-reflective (e.g., black) state. In certain embodiments, each reflective state produces white light or light of a color determined by the distance between the reflective layer 14 and the optical stack 16 when the modulator 12 is in a reflective state. In other embodiments, for example embodiments disclosed in U.S. Pat. No. 5,986,796, the reflective layer 14 may be positioned at a range of positions relative to the optical stack 16 to vary the size of the cavity 19, and thus the color of the reflected light.

The interferometric modulator 12 includes an optical cavity 19 formed between the reflective layer 14 and the optical stack 16. The effective optical path length, L, of the optical cavity 19 determines the resonant wavelength, λ, of the optical cavity 19 and thus of the interferometric modulator 12. In certain embodiments, the effective optical path length, L, is substantially equal to the distance between the reflective layer 14 and the optical stack 16. In certain embodiments, white light may be produced by having an effective optical path length, L, of less than about 100 Å (10 nm). The resonant wavelength, λ, of the interferometric modulator 12 generally corresponds to the perceived color of light reflected by the interferometric modulator 12, which in certain embodiments is described by Equation 1, where N is an integer.

$$L = \frac{1}{2} \cdot N \cdot \lambda \quad \text{(Eqn. 1)}$$

A selected resonant wavelength, λ, is thus reflected by interferometric modulators 12 having effective optical path lengths, L, of 0.5λ (N=1), λ (N=2), 1.5λ (N=3), etc. The integer N may be referred to as the "order" of interference of the reflected light. As used herein, the order of an interferometric modulator also refers to the order N of light reflected by the interferometric modulator when the reflective layer 14 is in at least one position. For example, a first order (N=1) red interferometric modulator may have an effective optical path length, L, of about 325 nm, corresponding to a wavelength, λ, of about 650 nm. Accordingly, a second order (N=2) red interferometric modulator may have an effective optical path length, L, of about 650 nm. A list of examples of wavelength ranges for some common colors used in interferometric modulator displays are shown in Table 1.

TABLE 1

| Color | Wavelength (nm) |
|---|---|
| Violet | 380-420 |
| Indigo | 420-440 |
| Blue | 440-500 |
| Cyan | 500-520 |
| Green | 520-565 |
| Yellow | 565-590 |
| Orange | 590-625 |
| Red | 625-740 |

When the cavity 19 comprises a fluid having an index of refraction of approximately 1 (e.g., air), the effective optical path length, L, is substantially equal to the distance between the reflective layer 14 and the optical stack 16. When the cavity 19 comprises a fluid having an index of refraction of greater than 1, the effective optical path length, L, may be different from the distance between the reflective layer 14 and the optical stack 16. In embodiments in which the optical stack 16 comprises an insulating layer, the effective optical path length, L, is affected by the thickness and index of refraction of the insulating layer such that the effective optical path length, L, is different from the distance between the reflective layer 14 and the optical stack 16. In certain embodiments, the distance between the reflective layer 14 and the optical stack 16 is selected to compensate for the fluid in the cavity 19 and/or an insulating layer in the optical stack 16 by modifying the thickness of a sacrificial material disposed between the reflective layer 14 and the optical stack 16 during fabrication of the interferometric modulator 12.

Generally, higher order modulators reflect light over a narrower range of wavelengths, and thus produce colored light that is more saturated. It will be appreciated that higher order modulators generally utilize larger distances between the reflective layer 14 and the optical stack 16. Additionally, because higher order modulators reflect a narrower range of wavelengths, the number of photons reflected is reduced and the display is less bright.

Figure 9:
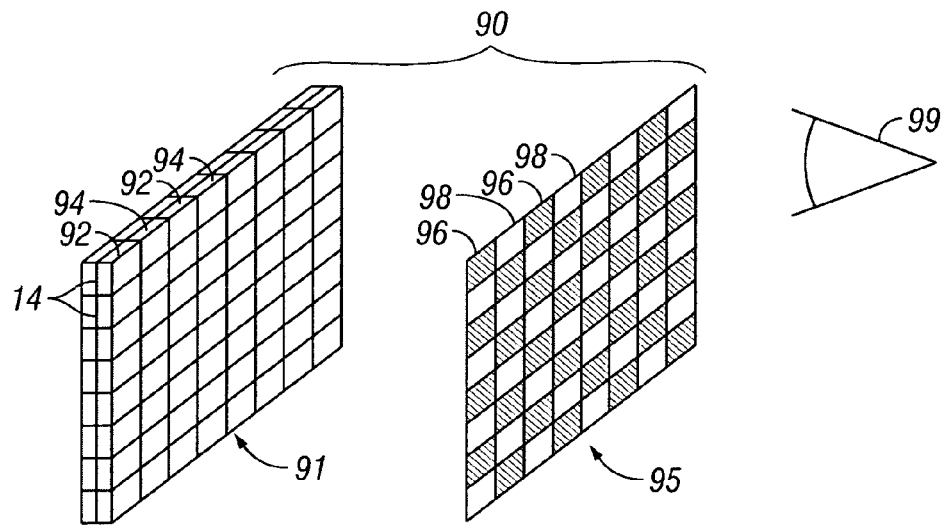
FIG. 9 is an exploded perspective view of one embodiment of a display comprising a plurality of interferometric modulators and one example of a plurality of filter elements.

FIG. 9 depicts an exploded schematic view of a display device 90 that can use spatial-temporal color synthesis. The display device 90 comprises a plurality of optical modulators (e.g., interferometric modulators 91) and a plurality of filter elements 95. The plurality of optical modulators 91 comprises a first set of optical modulators 92 and a second set of optical modulators 94. The first set of optical modulators 92 may be the same as or different from the second set of optical modulators 94. For example, in certain embodiments forming the first set of optical modulators comprises a first set of process steps and forming the second set of optical modulators comprises a second set of process steps, and the second set of steps comprises the first set of steps. Each optical modulator 91 is configured to be selectively switched among at least a first state, a second state, and a third state, each state having a different spectral reflectance. The plurality of filter elements 95 is disposed on a reflective side of the plurality of optical modulators 91. The plurality of filter elements 95 comprises a first set of filter elements 96 corresponding to the first set of optical modulators 92 and a second set of filter elements 98 corresponding to the second set of optical modulators 94. The first set of filter elements 96 has a different spectral transmittance than the second set of filter elements 98. As used herein, the term "corresponding" is a broad term including, but not limited to, being disposed substantially within the optical path, for example having the same size, shape, orientation, and position within the optical path.

Figure 8A:
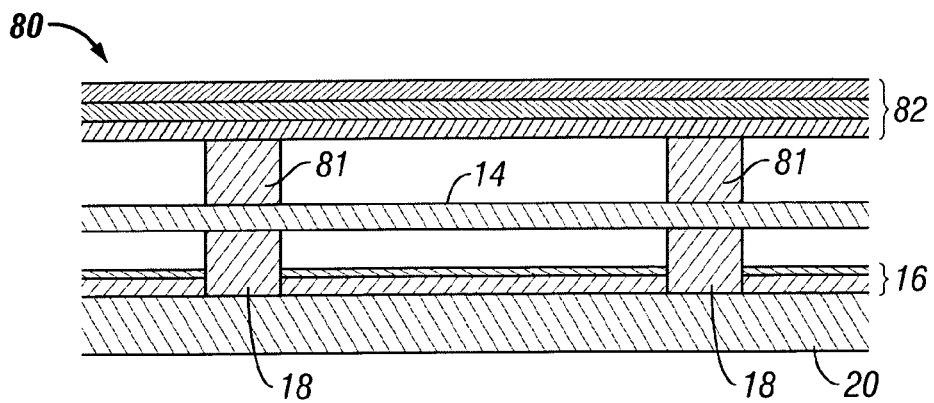
FIGS. 8A through 8C show schematic side cross-sectional views of an example multi-state interferometric modulator.
Figure 8B:
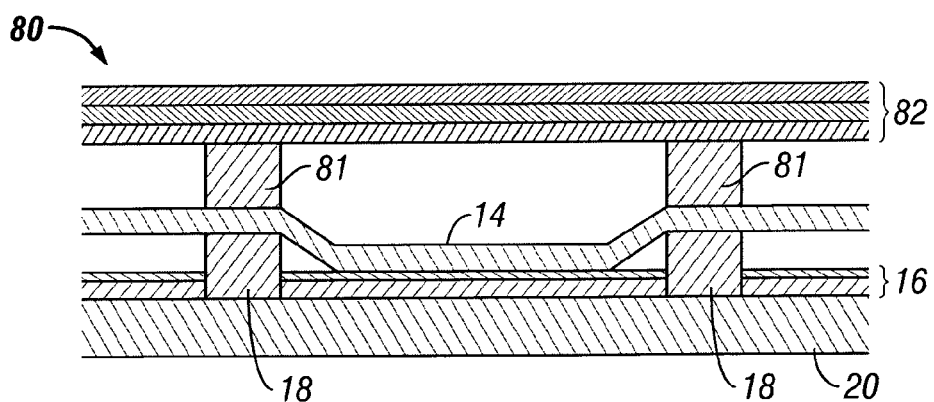
Figure 8C:
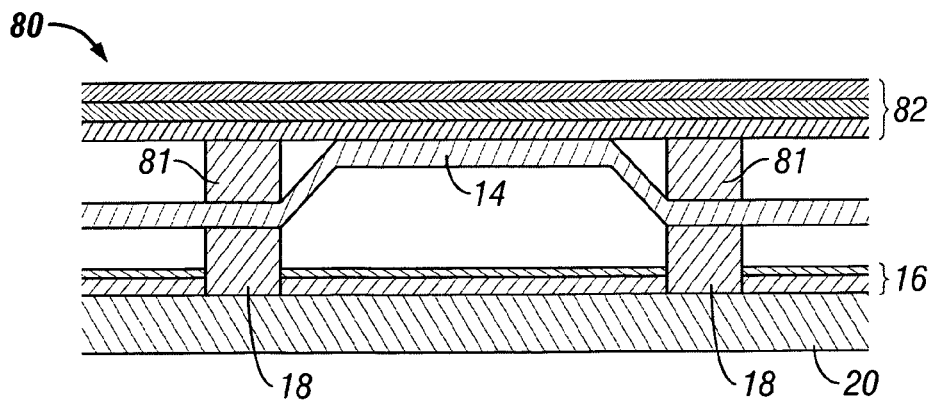

FIGS. 8A through 8C show schematic side cross-sectional views of an example multi-state interferometric modulator 80 compatible with certain embodiments described herein. The modulator 80 includes a movable reflective layer 14 that is positioned between an electrode in the optical stack 16 and an electrode in a bus stack 82, and is movable between a relaxed state, a first actuated state, and a second actuated state. Other configurations of multi-state interferometric modulators are also compatible with certain embodiments described herein.

In the example modulator 80 of FIGS. 8A through 8C, the bus stack 82 may be formed on posts 81 that are formed on the side of the reflective layer 14 opposite the posts 18. The bus stack 82, as referenced herein, typically comprises several fused layers, which can include a conductive electrode layer, such as aluminum, and an insulating dielectric layer. In certain preferred embodiments, the bus stack 82 comprises an insulating layer between the reflective layer 14 and the electrode in the bus stack 82 in order to prevent electrical shorts between conductive portions of the reflective layer 14 and the electrode in the bus stack 82. The bus stack 82 may be fabricated, for example, by depositing one or more of the above layers over a sacrificial layer formed on top of the reflective layer 14.

The modulator 80 can produce a first spectral reflectance in a first state, a second spectral reflectance in a second state, and a third spectral reflectance in a third state. FIG. 8A illustrates the modulator 80 in a relaxed state with the reflective layer 14 distal to the optical stack 16 and the bus stack 82. The relaxed state may comprise the first, second, or third state. FIG. 8B illustrates the modulator 80 in a first actuated (or "driven") state with the reflective layer 14 proximate to the optical stack 16. The first actuated state may comprise the first, second, or third state. FIG. 8C illustrates the modulator 80 in a second actuated (or "reverse driven") state with the reflective layer 14 proximate to the bus stack 82. The second actuated state may comprise the first, second, or third state. The distances from the reflective layer 14 to the partially reflective layer in the optical stack 16 in each of the relaxed state and the first and second actuated states, the fluid in the cavity 19, and properties of an insulating layer in the optical stack 16 can influence the spectral reflectances of the modulator 80 in those states.

As will be appreciated by one of skill in the art, the reverse driven state of FIG. 8C can be achieved in a number of ways. In one embodiment, the reverse driven state is achieved through the use of an electrode or conductive layer in the bus stack 82 that can electrostatically pull the reflective layer 14 in the upward direction. In such an embodiment, the modulator 80 basically includes two interferometric modulators positioned symmetrically around a single movable reflective layer 14. This configuration allows each of the electrodes of the optical stack 16 and the bus stack 82 to attract the reflective layer 14 in opposite directions.

The materials used to produce the layers of the bus stack 82 can be dissimilar to the materials used to produce the optical stack 16. For example, the bus stack 82 does not need to transmit light. Additionally, if the conductive layer of the bus stack 82 is positioned beyond the reach of the reflective layer 14 in its deformed upward position, then the modulator 80 may or may not include an insulating layer between the reflective layer 14 and the conductive layer in the bus stack 82.

The voltages applied to the optical stack 16 to drive the reflective layer 14 from the relaxed state of FIG. 8A to the driven state of FIG. 8B may be different than the voltage applied to the optical stack 16 to drive the reflective layer 14 from the reverse driven state of FIG. 8C to the driven state of FIG. 8B. The voltages applied to the bus stack 82 to drive the reflective layer 14 from the relaxed state of FIG. 8A to the reverse driven state of FIG. 8C may be different than the voltage applied to the bus stack 82 to drive the reflective layer 14 from the driven state of FIG. 8B to the reverse driven state of FIG. 8C. The voltages applied to the bus stack 82 to drive the reflective layer 14 from the relaxed state of FIG. 8A or the driven state of FIG. 8B to the reverse driven state of FIG. 8C may or may not be the same as the voltages applied to the optical stack 16 to drive the reflective layer 14 from the relaxed state of FIG. 8A or the reverse driven state of FIG. 8C to the driven state of FIG. 8B. Such voltages can depend upon the desired application and amounts of deflection, and can be determined by one of skill in the art in view of the present disclosure.

Figure 10:
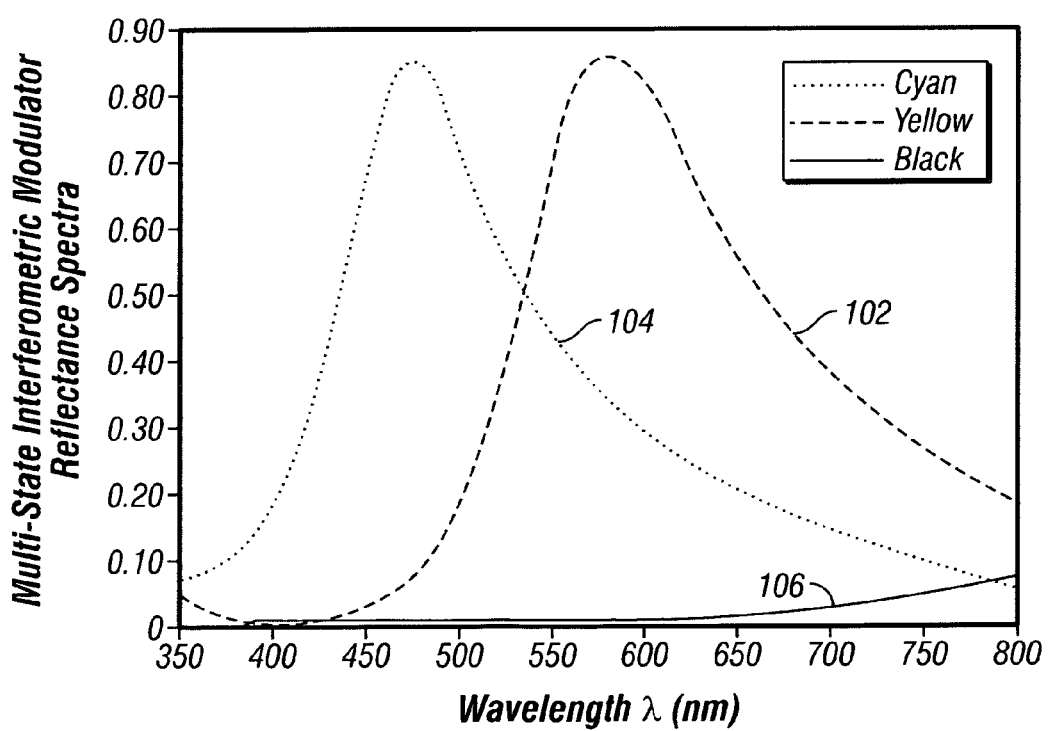
FIG. 10 illustrates an example of reflectance spectra for a multi-state interferometric modulator.

FIG. 10 illustrates an example of reflectance spectra for a multi-state interferometric modulator in accordance with certain embodiments described herein. The spectral reflectance of the first state, depicted by the dashed line 102, is substantially yellow, the spectral reflectance of the second state, depicted by the dotted line 104, is substantially cyan, and the spectral reflectance of the third state, depicted by the solid line 106, is substantially black. In order to produce such spectra, the distance between the reflective layer 14 and the optical stack 16 in FIG. 8A may be between about 250 and 260 nm (e.g., for first order cyan reflectance), between about 500 and 520 nm (e.g., for second order cyan reflectance), or between about 750 nm and 780 nm (e.g., for third order cyan reflectance), and the distance between the reflective layer 14 and the optical stack 16 in FIG. 8C may be between about 283 and 295 nm (e.g., for first order yellow reflectance), between about 565 and 590 nm (e.g., for second order yellow reflectance), or between about 848 nm and 885 nm (e.g., for third order yellow reflectance). Distances corresponding to higher orders are also possible. It will be appreciated that the distances may depend on the fluid in the cavity 19, properties of an insulating layer in the optical stack 16, the overall thickness of the device, and the precision of the deposition and removal processes used to manufacture the device.

In certain embodiments, the spectral reflectance of the first state is substantially yellow, the spectral reflectance of the second state is substantially blue, and the spectral reflectance of the third state is substantially black. In order to produce such reflectances, the distance between the reflective layer 14 and the optical stack 16 in FIG. 8A may be between about 220 and 250 nm (e.g., for first order blue reflectance), between about 440 and 500 nm (e.g., for second order blue reflectance), or between about 660 nm and 750 nm (e.g., for third order blue reflectance), and the distance between the reflective layer 14 and the optical stack 16 in FIG. 8C may be between about 283 and 295 nm (e.g., for first order yellow reflectance), between about 565 and 590 nm (e.g., for second order yellow reflectance), or between about 848 nm and 885 nm (e.g., for third order yellow reflectance). Distances corresponding to higher orders are also possible.

In certain embodiments, the plurality of filter elements 95 comprises a transparent material (e.g., glass, plastic, etc.) with a concentration of dye or pigmentation corresponding to each filter element 95. In some embodiments, the plurality of filter elements 95 is about one-half as thick as a similar plurality of filter elements would be for a LCD display using hybrid spatial-temporal color synthesis. In some embodiments, the plurality of filter elements 95 has about one-half as much concentration of dye or pigmentation as a similar plurality of filter elements would have in a LCD display using hybrid spatial-temporal color synthesis. Suitable color filters are available, for example, from Toppan of Tokyo, Japan and from Brewer Science, Inc. of Rolla, Mo.

Figure 11:
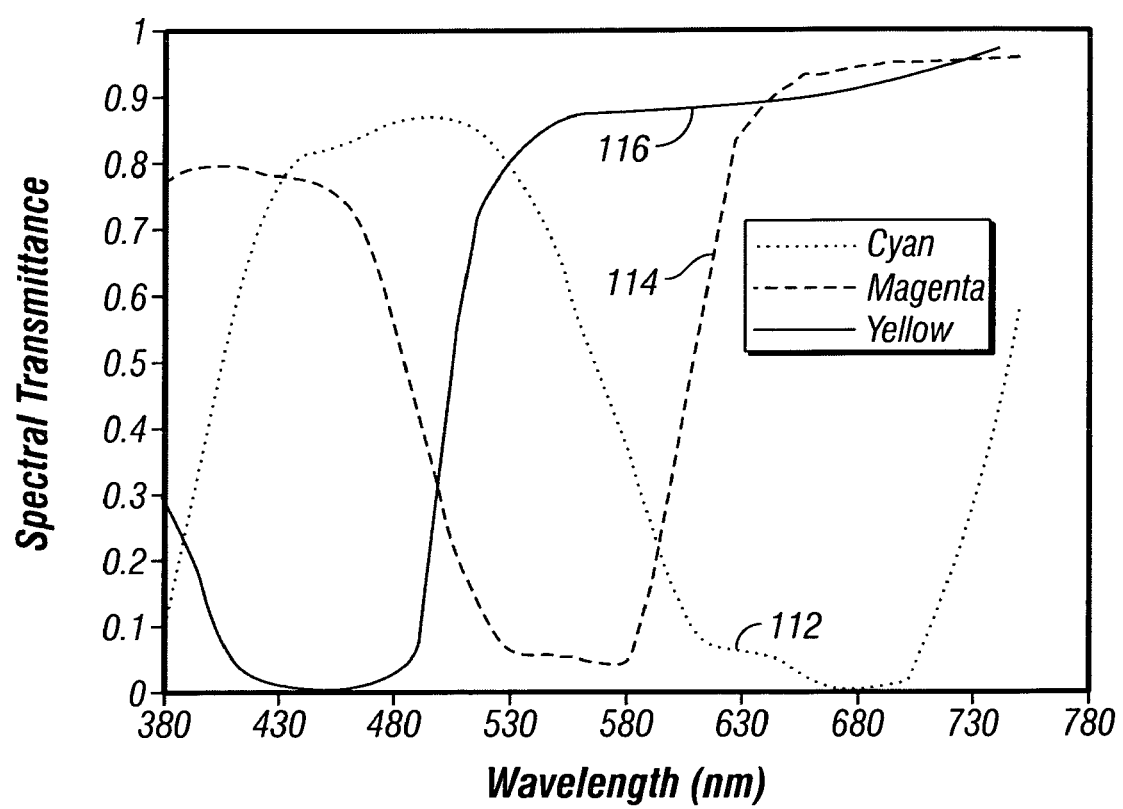
FIG. 11 is a chart plotting the spectral transmittance of example filter elements versus wavelength.

FIG. 11 is a chart plotting the spectral transmittance of example filter elements 95 versus wavelength, %. A cyan filter element, depicted by the dotted line 112, substantially transmits light from about 430 to 530 nm. A magenta filter element, depicted by the dashed line 114, substantially transmits light from about 380 to 480 nm and from about 600 to 740 nm. A yellow filter element, depicted by the solid line 116, substantially transmits light from about 500 to 740 nm.

Figure 12D:
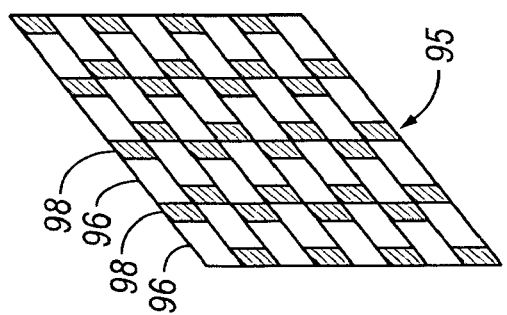
FIGS. 12A through 12D illustrate further examples of pluralities of filter elements.
Figure 12C:
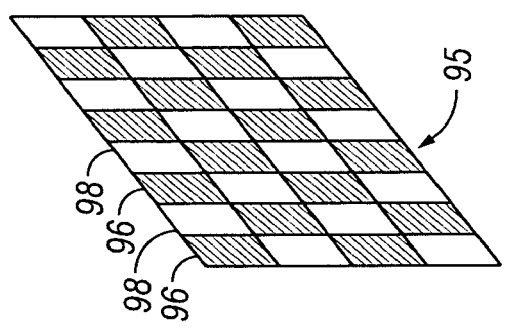
Figure 12B:
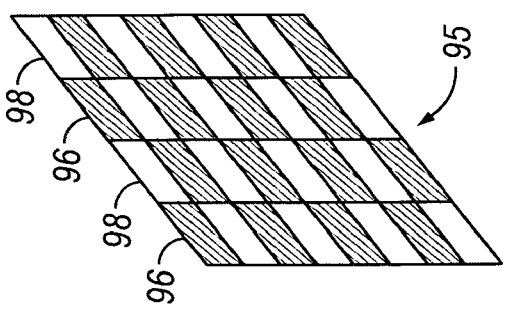
Figure 12A:
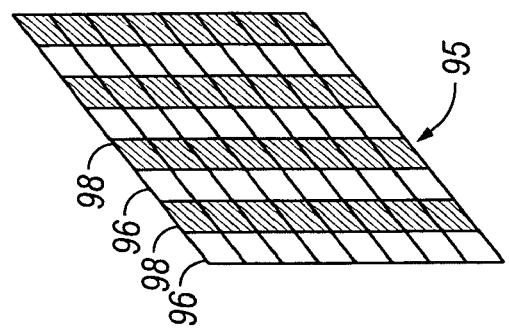

In certain embodiments, the size and shape of each filter element corresponds to the size and shape of a corresponding interferometric modulator (e.g., as illustrated in FIGS. 9 and 12A). In some embodiments, the plurality of filter elements 95 forms a checkerboard pattern in which the first set of filter elements 96 alternates with the second set of filter elements 98 in two substantially perpendicular directions (e.g., as illustrated in FIG. 9). In some embodiments, the plurality of filter elements 95 forms a series of vertical rows in which the first set of filter elements 96 alternates with the second set of filter elements 98 in one direction (e.g., as illustrated in FIG. 12A).

In certain embodiments, the shape of each filter element 96, 98 is substantially rectangular (e.g., as illustrated in FIG. 9). In some embodiments, the size and shape of each filter element corresponds to the size and shape of a plurality of interferometric modulators (e.g., as illustrated in FIGS. 12B and 12C). In such embodiments, a portion of the filter element is disposed in the optical path of an optical modulator such that it corresponds to each of the optical modulators in the plurality of optical modulators. As such, a pixel may comprise a pair of optical modulators and each having different corresponding filter elements. As used herein, the term "corresponds" is a broad term including, but not limited to, having substantially the same dimensions. In some embodiments, the interferometric modulators 92, 94 and the corresponding filter elements 96, 98 have other shapes, including, but not limited to, square, triangular, trapezoidal, and polygonal.

Figure 13A:
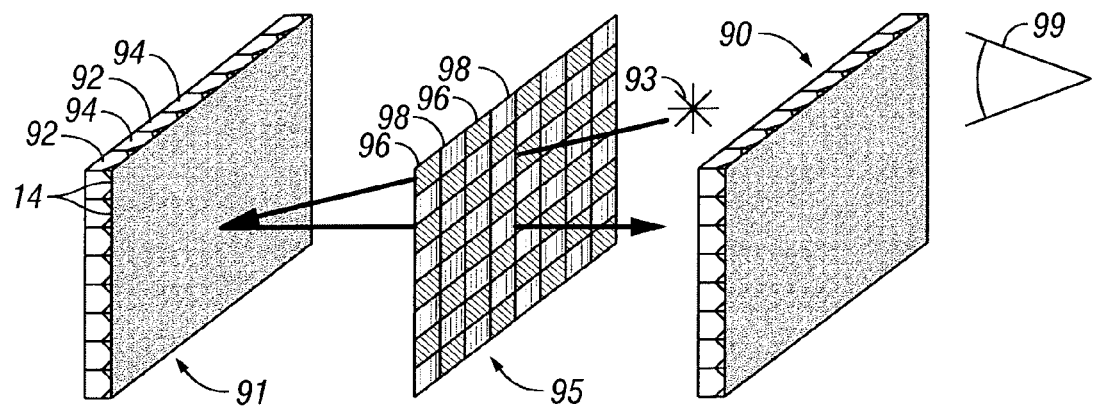
FIGS. 13A through 13D are exploded perspective views of an embodiment of a display comprising pluralities of interferometric modulators in various states and a plurality of filter elements.

FIGS. 13A through 13D illustrate an example display device 90 with a plurality of optical modulators (e.g., interferometric modulators 91) in various states. The plurality of optical modulators 91 includes a first set of optical modulators 92 and a second set of optical modulators 94. In the embodiment illustrated in FIGS. 13A-13D, the optical modulators 92, 94 comprise a plurality of interferometric modulators including a movable reflective layer 14. The display device 90 comprises a plurality of filter elements 95 including a first set of filter elements 96 having a spectral transmittance of cyan and corresponding to the first set of optical modulators 92 and a second set of filter elements 98 having a spectral transmittance of magenta and corresponding to the second set of optical modulators 94. In FIG. 13A, the optical modulators 91 are all in a state having a spectral reflectance of black. For example, using the modulator of FIGS. 8A through 8C, each modulator 91 is in an actuated state with the reflective layer 14 proximate to the optical stack 16. Regardless of the spectral transmittance of the corresponding filter element, the pixels corresponding to all of the modulators 91 of FIG. 13A appear black to an observer 99.

Figure 13B:
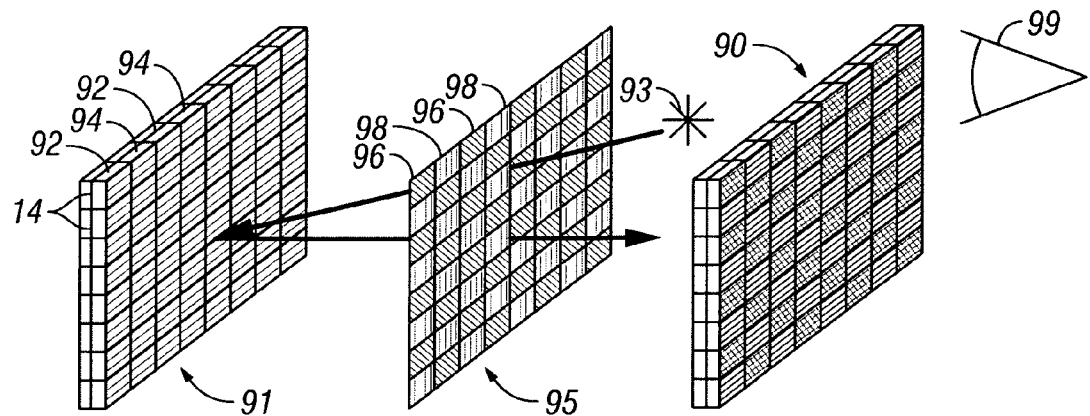
Figure 13C:
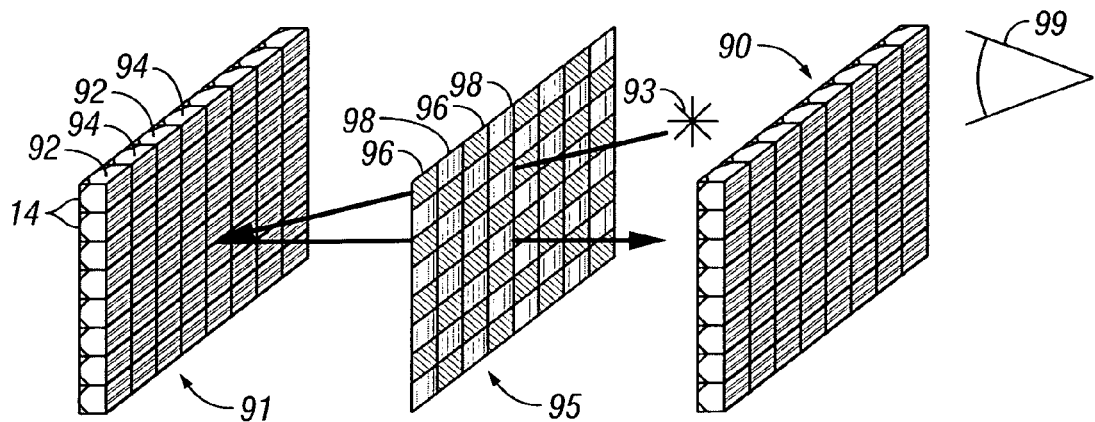
Figure 13D:
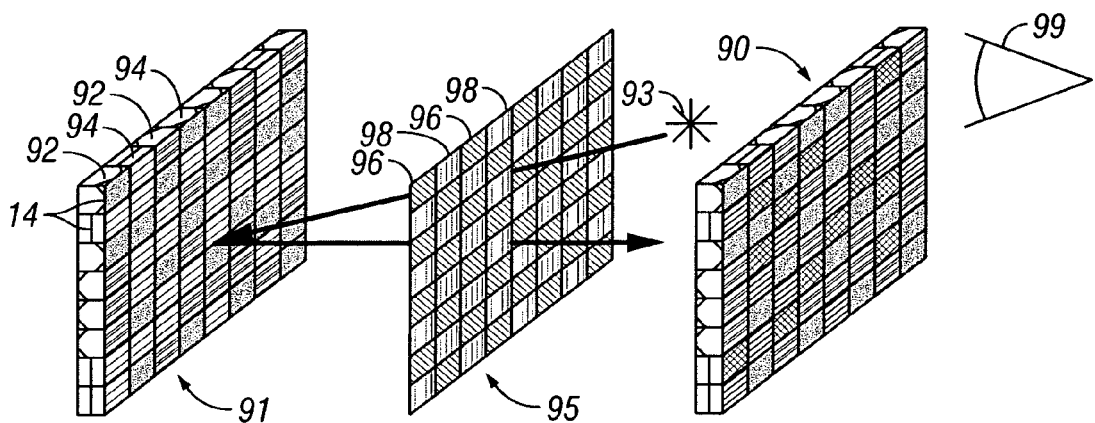

In FIG. 13B, the optical modulators 91 are in a state having a spectral reflectance of yellow. For example, using the modulator of FIGS. 8A through 8C, each modulator 91 is in a relaxed state. Light from a light source 93 transmitted through the first set of filter elements 96, reflected from the optical modulators 91, and again transmitted through the first set of filter elements 96 appears green to an observer 99. Light from a light source 93 transmitted through the second set of filter elements 98, reflected from the optical modulators 91, and again transmitted through the second set of filter elements 98 appears red to an observer 99. In FIG. 13C, the optical modulators 91 are in a state having a spectral reflectance of blue. For example, using the modulator of FIGS. 8A through 8C, each modulator 91 is in an actuated state with the reflective layer 14 proximate to the bus stack 82. Regardless of the spectral transmittance of the corresponding filter element, the pixels corresponding to all of the modulators 91 of FIG. 13C appear blue to an observer 99. In FIG. 13D, the optical modulators 91 are in various states with spectral reflectances of yellow, blue, and black. Thus, by selectively actuating particular optical modulators 91, the display device 90 can produce an image with a pixel comprising green, red, blue, and black areas.

Figure 14A:
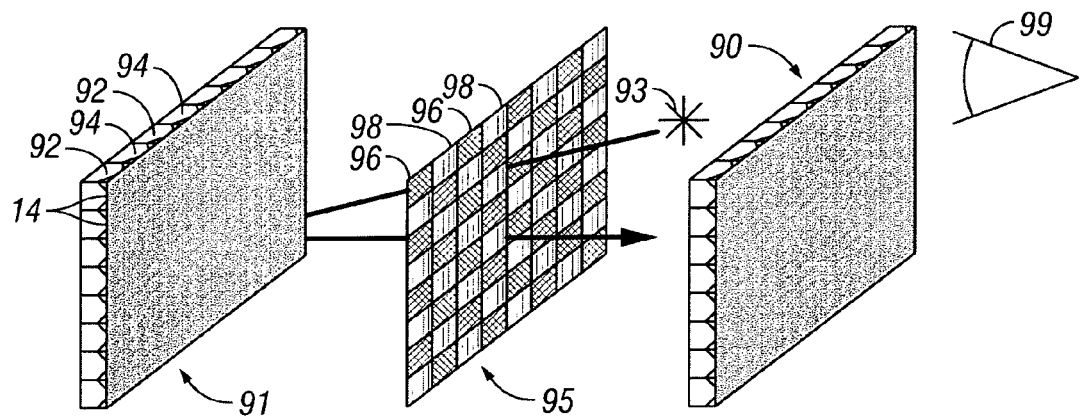
FIGS. 14A through 14D are exploded perspective views of another embodiment of a display comprising pluralities of interferometric modulators in various states and a plurality of filter elements.

FIGS. 14A through 14D illustrate an example display device 90 with a plurality of optical modulators (e.g., interferometric modulators 91) in various states. The plurality of optical modulators 91 includes a first set of optical modulators 92 and a second set of optical modulators 94. In the embodiment illustrated in FIGS. 13A-13D, the optical modulators 92, 94 comprise a plurality of interferometric modulators including a movable reflective layer 14. The display device 90 comprises a plurality of filter elements 95 including a first set of filter elements 96 having a spectral transmittance of green and corresponding to the first set of optical modulators 92 and a second set of filter elements 98 having a spectral transmittance of magenta and corresponding to the second set of optical modulators 94. In FIG. 14A, the optical modulators 91 are all in a state having a spectral reflectance of black. For example, using the modulator of FIGS. 8A through 8C, each modulator 91 is in an actuated state with the reflective layer 14 proximate to the optical stack 16. Regardless of the spectral transmittance of the corresponding filter element, the pixels corresponding to all of the modulators 91 of FIG. 14A appear black to an observer 99.

Figure 14B:
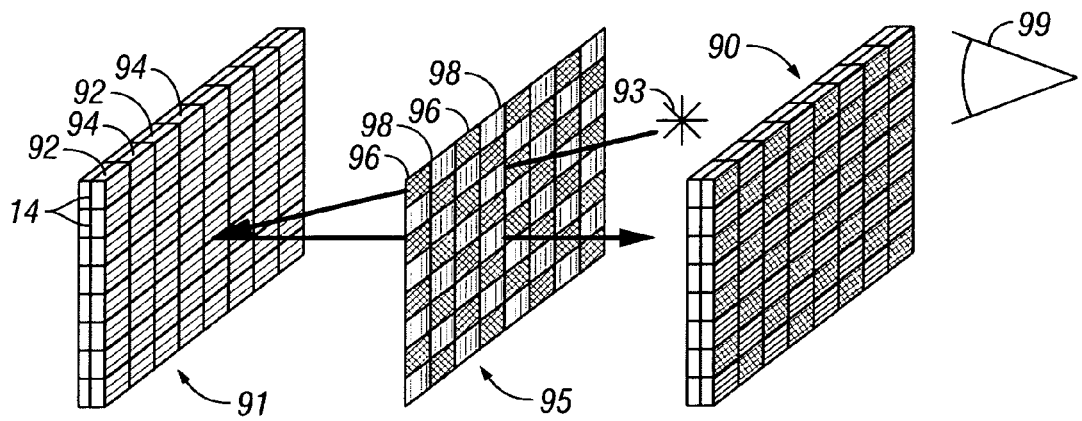
Figure 14C:
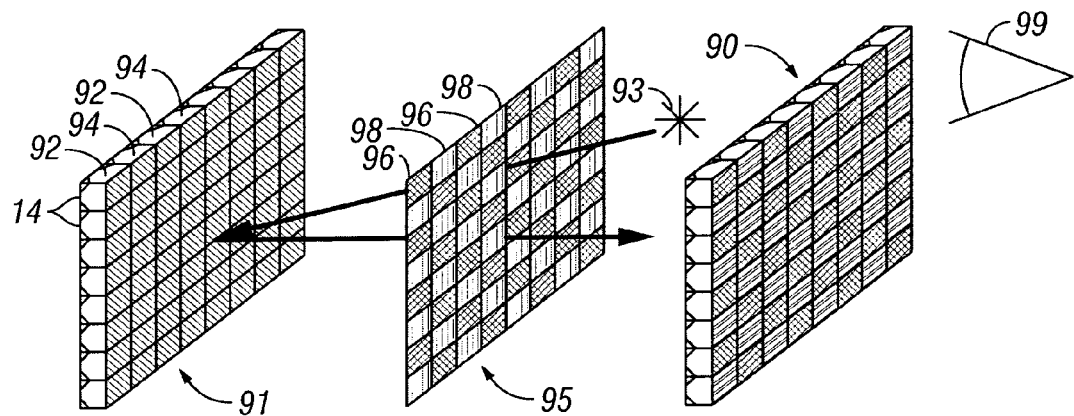
Figure 14D:
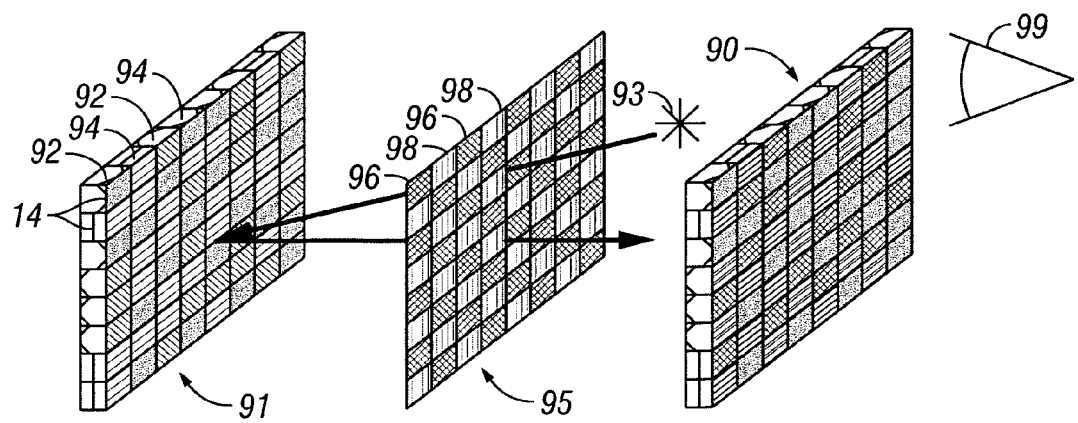

In FIG. 14B, the optical modulators 91 are in a state having a spectral reflectance of yellow. For example, using the modulator of FIGS. 8A through 8C, each modulator 91 is in a relaxed state. Light from a light source 93 transmitted through the first set of filter elements 96, reflected from the optical modulators 91, and again transmitted through the first set of filter elements 96 appears green to an observer 99. Light from a light source 93 transmitted through the second set of filter elements 98, reflected from the optical modulators 91, and again transmitted through the second set of filter elements 98 appears red to an observer 99. In FIG. 14C, the optical modulators 91 are in a state having a spectral reflectance of cyan. For example, using the modulator of FIGS. 8A through 8C, each modulator 91 is in an actuated state with the reflective layer 14 proximate to the bus stack 82. Light from a light source 93 transmitted through the first set of filter elements 96, reflected from the optical modulators 91, and again transmitted through the first set of filter elements 96 appears green to an observer 99. Light from a light source 93 transmitted through the second set of filter elements 98, reflected from the optical modulators 91, and again transmitted through the second set of filter elements 98 appears blue to an observer 99. In FIG. 14D, the optical modulators 91 are in various states with spectral reflectances of yellow, cyan, and black. Thus, by actuating particular optical modulators 91, the display device 90 can produce an image with a pixel comprising green, red, blue, and black areas. It will be appreciated that displays comprising optical modulators with other spectral reflectances and filter elements with other spectral transmittances are also possible.

In certain embodiments, the display device 90 is configured to produce a full color spectrum (i.e., displays devices that produce three or more primary colors suitable for rendering color images). A pair of optical modulators and a pair of filter elements with the appropriate spectral reflectances and spectral transmittances, respectively, can produce a full color spectrum with the appropriate spatial and/or temporal synthesis. A plurality of optical modulators and a plurality of filter elements can thereby produce a color image. The following examples are not intended to be limiting, and other combinations using primary, secondary, and other colors are also hereby disclosed.

FIGS. 15A through 15G illustrate an example embodiment of a portion of a full color display comprising a first pixel element 151 and a second pixel element 152. Each pixel element 151, 152 comprises an optical modulator 153, 155, respectively, that can be switched between states having spectral reflectances of yellow, blue, and black. The first pixel element 151 includes a corresponding first filter element 154 with a spectral transmittance of magenta. The second pixel element 152 includes a second filter element 156 with a spectral transmittance of cyan. The display can use spatial and/or temporal color synthesis to produce a full color spectrum.

Figure 15A:
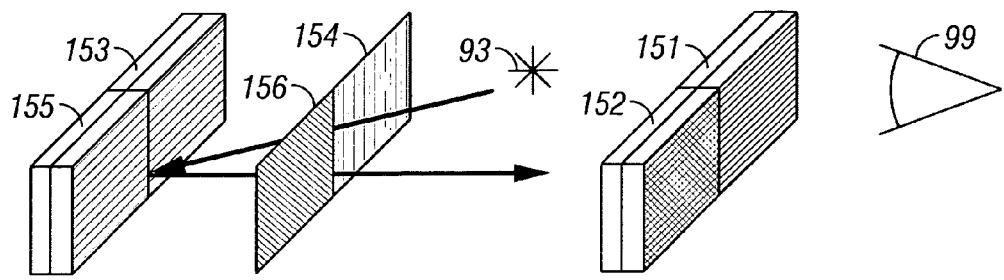
FIGS. 15A through 15G are exploded perspective views of an embodiment of a pair of interferometric modulators in various states and a pair of corresponding filter elements.
Figure 15B:
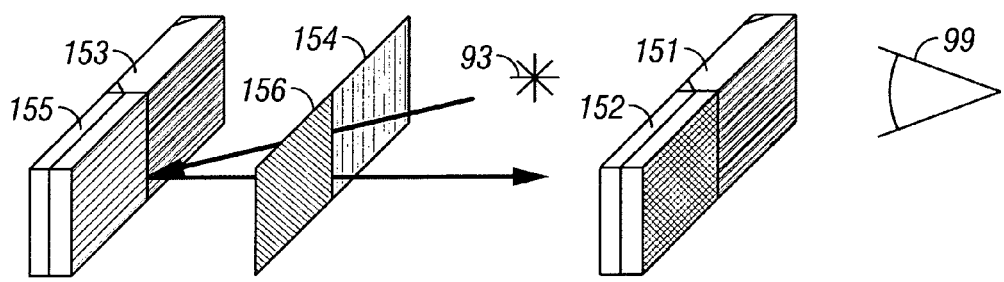

FIGS. 15A and 15B depict an embodiment of the formation of the color white using spatial-temporal color synthesis of the first and second pixel elements 151, 152. In FIG. 15A, the optical modulators 153, 155 are in a state having a spectral reflectance of yellow. For example, using the modulator 80 of FIGS. 8A through 8C, each modulator 153, 155 is in a relaxed state. Light from a light source 93 transmitted through the first filter element 154, reflected from the optical modulator 153, and again transmitted through the first filter element 154 appears red to an observer 99. Light from a light source 93 transmitted through the second filter element 156, reflected from the optical modulator 155, and again transmitted through the second filter element 156 appears green to an observer 99. It will be appreciated that the display of red and green in a single temporal field appears yellow to an observer 99. In an adjacent temporal field depicted in FIG. 15B, the optical modulator 155 remains in a state having a spectral reflectance of yellow and the optical modulator 153 is in a state having a spectral reflectance of blue. For example, using the modulator 80 of FIGS. 8A through 8C, the modulator 153 is in an actuated state with the reflective layer 14 proximate to the bus stack 82. Light from a light source 93 transmitted through the first filter element 154, reflected from the optical modulator 153, and again transmitted through the first filter element 154 appears blue to an observer 99. Light from a light source 93 transmitted through the second filter element 156, reflected from the optical modulator 155, and again transmitted through the second filter element 156 continues to appear green to an observer 99. It will be appreciated that the display of blue and green in a single temporal field appears cyan to an observer 99. Spatially and temporally mixing the light with spectral reflectances of green, blue, and red can synthesize white with the appropriate ratios. In some embodiments, the weighting coefficients of green, red, and blue are about 0.7152, 0.2126, and 0.0722, respectively. In some embodiments, the weighting coefficients of green, red, and blue are about 0.587, 0.299, and 0.114, respectively.

Figure 15C:
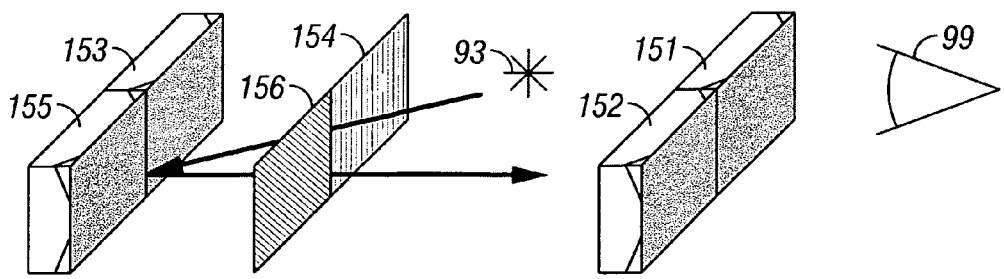

FIGS. 15C through 15G depict the formation of certain other primary colors in a single temporal field (e.g., in addition to the colors yellow and cyan described above for FIGS. 15A and 15B, respectively). In FIG. 15C, the optical modulators (e.g., interferometric modulators) 153, 155 are in a state having a spectral reflectance of black. For example, using the modulator 80 of FIGS. 8A through 8C, each modulator 153, 155 is in an actuated state with the reflective layer 14 proximate to the optical stack 16. When the optical modulator 153 is in a state having a spectral reflectance of black, light from a light source 93 transmitted through the first filter element 154 is substantially destructively reflected by the optical modulator 153, so the first pixel element 151 appears black to an observer 99. When the optical modulator 155 is in a state having a spectral reflectance of black, light from a light source 93 transmitted through the second filter element 156 is substantially destructively reflected by the optical modulator 155, so the second pixel element 153 appears black to an observer 99. Thus, the display can synthesize black.

Figure 15D:
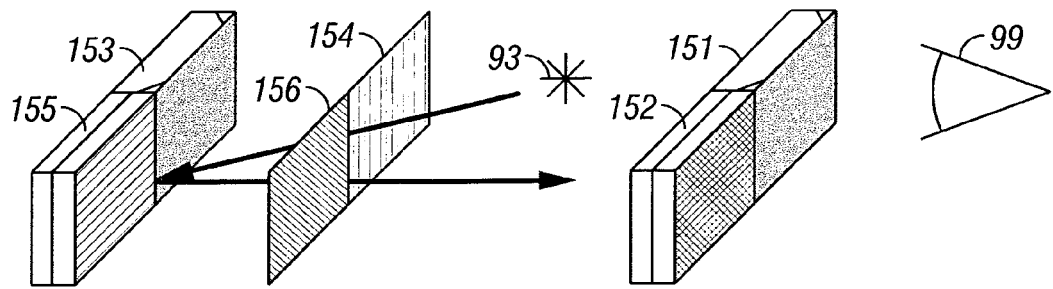

In FIG. 15D, the optical modulator 153 is in a state having a spectral reflectance of black and the optical modulator 155 is in a state having a spectral reflectance of yellow. When the optical modulator 153 is in a state having a spectral reflectance of black, light from a light source 93 transmitted through the first filter element 154 is substantially destructively reflected by the optical modulator 153, so the first pixel element 151 appears black to an observer 99. Light from a light source 93 transmitted through the second filter element 156, reflected from the optical modulator 155, and again transmitted through the second filter element 156 appears green to an observer 99. Thus, the display can synthesize green.

Figure 15E:
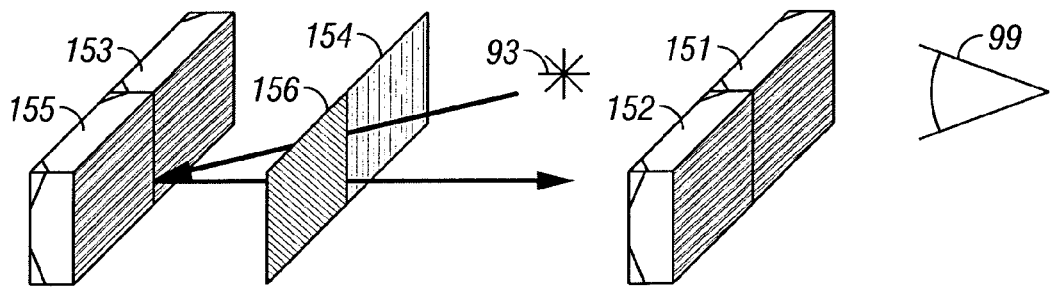

In FIG. 15E, the optical modulators 153, 155 are in a state having a spectral reflectance of blue. Light from a light source 93 transmitted through the first filter element 154, reflected from the optical modulator 153, and again transmitted through the first filter element 154 appears blue to an observer 99. Light from a light source 93 transmitted through the second filter element 156, reflected from the optical modulator 155, and again transmitted through the second filter element 156 appears blue to an observer 99. Thus, the display can synthesize blue. It will be appreciated that the display can also synthesize blue if either the first optical modulator 153 or the second optical modulator 155 is in a state having a spectral reflectance of black.

Figure 15F:
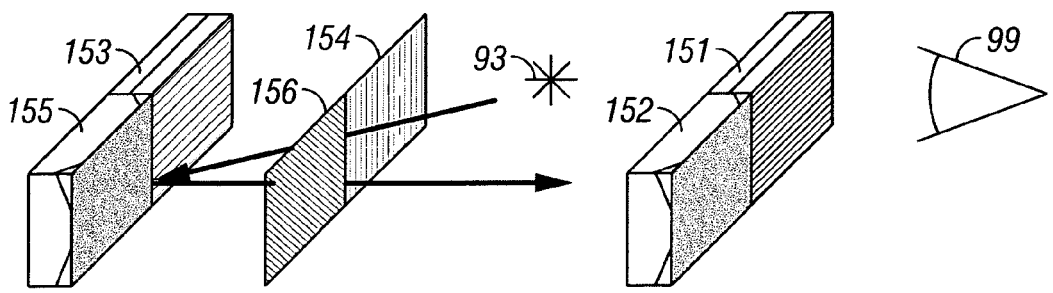

In FIG. 15F, the optical modulator 153 is in a state having a spectral reflectance of yellow and the optical modulator 155 is in a state having a spectral reflectance of black. Light from a light source 93 transmitted through the first filter element 154, reflected from the optical modulator 153, and again transmitted through the first filter element 154 appears red to an observer 99. When the optical modulator 155 is in a state having a spectral reflectance of black, light from a light source 93 transmitted through the second filter element 156 is substantially destructively reflected by the optical modulator 155, so the second pixel element 152 appears black to an observer 99. Thus, the display can synthesize red.

Figure 15G:
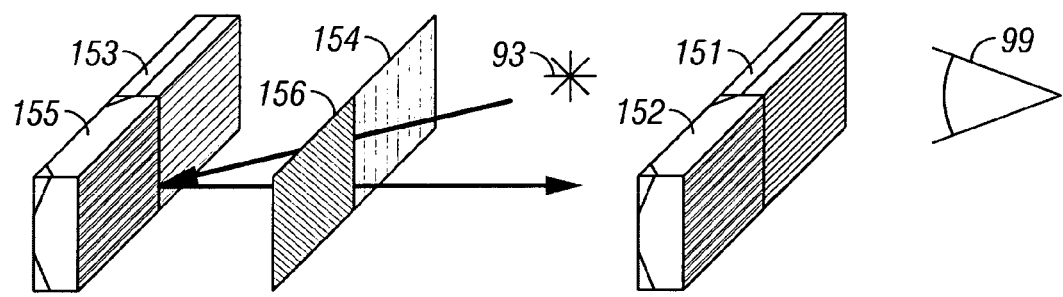

In FIG. 15G, the optical modulator 153 is in a state having a spectral reflectance of yellow and the optical modulator 155 is in a state having a spectral reflectance of blue. Light from a light source 93 transmitted through the first filter element 154, reflected from the optical modulator 153, and again transmitted through the first filter element 154 appears red to an observer 99. Light from a light source 93 transmitted through the second filter element 156, reflected from the optical modulator 155, and again transmitted through the second filter element 156 appears blue to an observer 99. Thus, the display can synthesize magenta.

In accordance with color theory, various mixtures of red, green, and blue can be used to synthesize a full color spectrum. As an example, temporally mixing the green of FIG. 15D with the red of FIG. 15F can produce orange. As another example, temporally mixing the green of FIG. 15D, the blue of FIG. 15E, and the red of FIG. 15F can also produce white. The component colors are preferably temporally mixed in less than $1/60$ seconds (approximately 16 milliseconds) such that the HVS cannot resolve the component colors.

FIGS. 16A through 16F illustrate an example embodiment of a portion of a full color display comprising a first pixel element 161 and a second pixel element 162. Each pixel element 161, 162 comprises an optical modulator (e.g., an interferometric modulator) 163, 165, respectively, that can be switched between states having spectral reflectances of yellow, cyan, and black. The first pixel element 161 includes a corresponding first filter element 164 with a spectral transmittance of magenta. The second pixel element 162 includes a second filter element 166 with a spectral transmittance of green. The display can use spatial and/or temporal color synthesis to produce a full color spectrum.

Figure 16A:
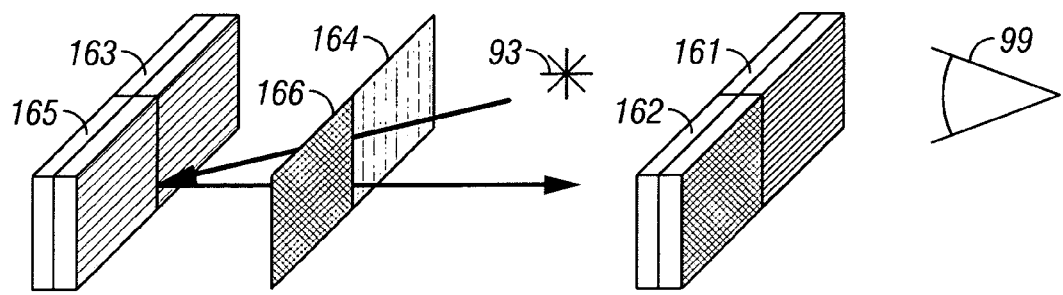
FIGS. 16A through 16F are exploded perspective views of another embodiment of a pair of interferometric modulators in various states and a pair of corresponding filter elements.
Figure 16B:
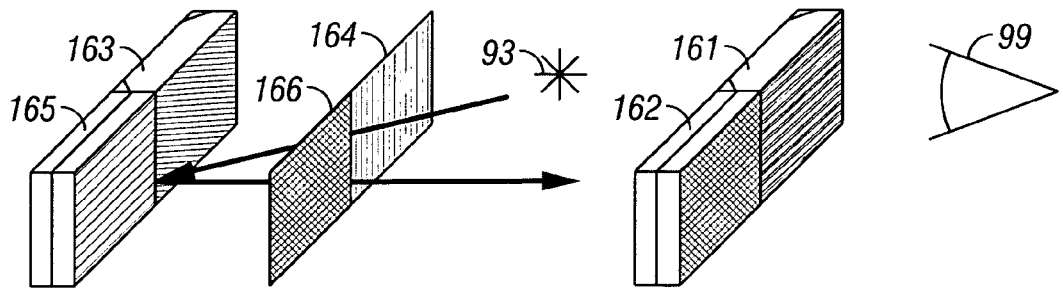

FIGS. 16A and 16B depict an embodiment of the formation of the color white using spatial temporal color synthesis of the first and second pixel elements 161, 162. In FIG. 16A, the optical modulators 163, 165 are in a state having a spectral reflectance of yellow. For example, using the modulator 80 of FIGS. 8A through 8C, each modulator 163, 165 is in a relaxed state. Light from a light source 93 transmitted through the first filter element 164, reflected from the optical modulator 163, and again transmitted through the first filter element 164 appears red to an observer 99. Light from a light source 93 transmitted through the second filter element 166, reflected from the optical modulator 165, and again transmitted through the second filter element 166 appears green to an observer 99. It will be appreciated that the display of red and green in a single temporal field appears yellow to an observer 99. In an adjacent temporal field depicted in FIG. 16B, the optical modulator 165 remains in a state having a spectral reflectance of yellow and the optical modulator 163 is in a state having a spectral reflectance of cyan. For example, using the modulator 80 of FIGS. 8A through 8C, the modulator 163 is in an actuated state with the reflective layer 14 proximate to the bus stack 82. Light from a light source 93 transmitted through the first filter element 164, reflected from the optical modulator 163, and again transmitted through the first filter element 164 appears blue to an observer 99. Light from a light source 93 transmitted through the second filter element 166, reflected from the optical modulator 165, and again transmitted through the second filter element 166 continues to appear green to an observer 99. It will be appreciated that the display of blue and green in a single temporal field appears cyan to an observer 99. Spatially and temporally mixing the light with spectral reflectances of green, blue, and red can synthesize white with the appropriate ratios. In some embodiments, the weighting coefficients of green, red, and blue are about 0.7152, 0.2126, and 0.0722, respectively. In some embodiments, the weighting coefficients of green, red, and blue are about 0.587, 0.299, and 0.114, respectively. It will also be appreciated that white may also be produced if the optical modulator 165 was in a state having a spectral reflectance of cyan in either temporal field (i.e., the first pixel element would appear green to an observer 99).

Figure 16C:
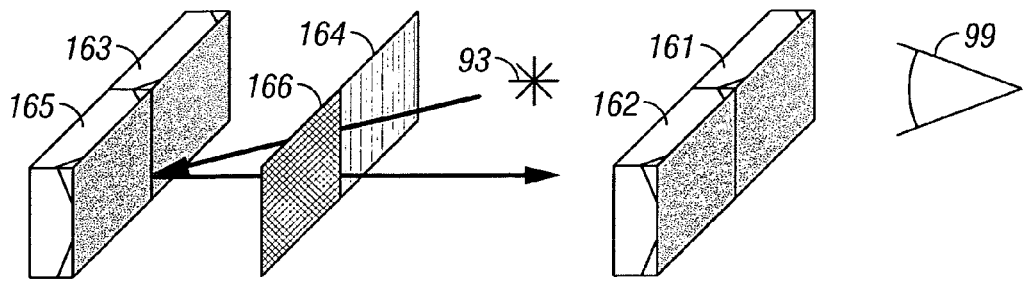

FIGS. 16C through 16F depict the formation of certain other primary colors in a single temporal field (e.g., in addition to the colors yellow and cyan described above for FIGS. 16A and 16B, respectively). In FIG. 16C, the optical modulators 163, 165 are in a state having a spectral reflectance of black. When the optical modulator 163 is in a state having a spectral reflectance of black, light from a light source 93 transmitted through the first filter element 164 is substantially destructively reflected by the optical modulator 163, so the first pixel element 161 appears black to an observer 99. When the optical modulator 165 is in a state having a spectral reflectance of black, light from a light source 93 transmitted through the second filter element 166 is substantially destructively reflected by the optical modulator 165, so the second pixel element 162 appears black to an observer 99. Thus, the display can synthesize black.

Figure 16D:
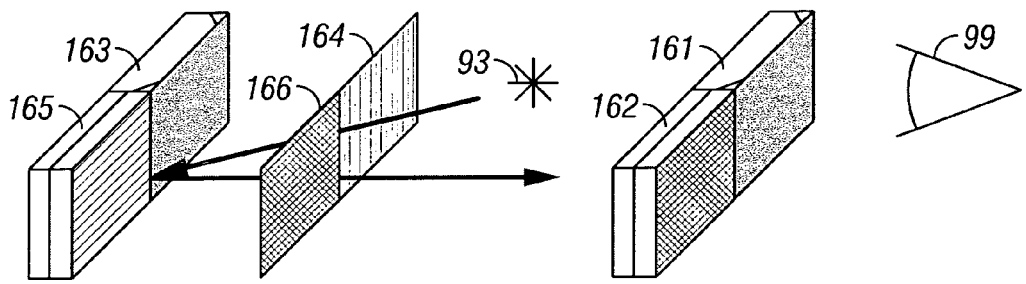

In FIG. 16D, the optical modulator 163 is in a state having a spectral reflectance of black and the optical modulator 165 is in a state having a spectral reflectance of yellow. When the optical modulator 163 is in a state having a spectral reflectance of black, light from a light source 93 transmitted through the first filter element 164 is substantially destructively reflected by the optical modulator 163, so the first pixel element 161 appears black to an observer 99. Light from a light source 93 transmitted through the second filter element 166, reflected from the optical modulator 165, and again transmitted through the second filter element 166 appears green to an observer 99. Thus, the display can synthesize green. It will be appreciated that green may also be produced if the optical modulator 165 is in a state having a spectral reflectance of cyan (i.e., the first pixel element would appear green to an observer 99).

Figure 16E:
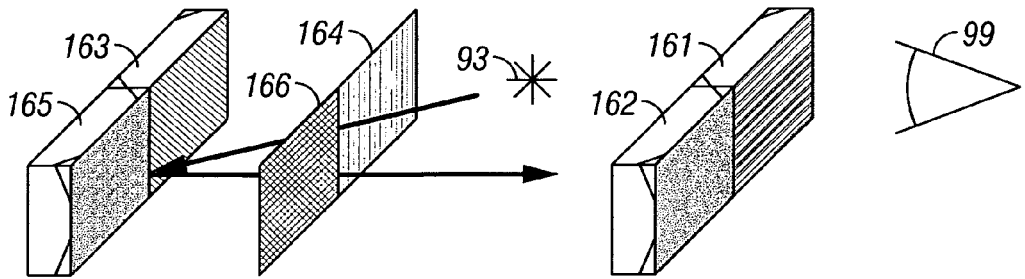

In FIG. 16E, the optical modulator 163 is in a state having a spectral reflectance of cyan and the optical modulator 165 is in a state having a spectral reflectance of black. Light from a light source 93 transmitted through the first filter element 164, reflected from the optical modulator 163, and again transmitted through the first filter element 164 appears blue to an observer 99. When the optical modulator 165 is in a state having a spectral reflectance of black, light from a light source 93 transmitted through the second filter element 166 is substantially destructively reflected by the optical modulator 165, so the second pixel element 162 appears black to an observer 99. Thus, the display can synthesize blue.

Figure 16F:
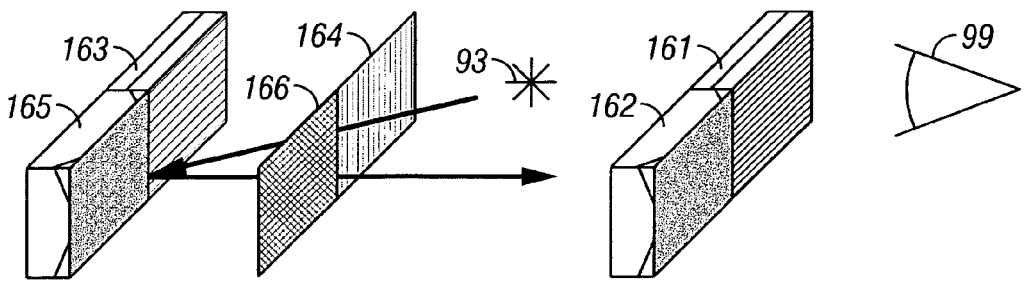

In FIG. 16F, the optical modulator 163 is in a state having a spectral reflectance of yellow and the optical modulator 165 is in a state having a spectral reflectance of black. Light from a light source 93 transmitted through the first filter element 164, reflected from the optical modulator 163, and again transmitted through the first filter element 164 appears red to an observer 99. When the optical modulator 165 is in a state having a spectral reflectance of black, light from a light source 93 transmitted through the second filter element 166 is substantially destructively reflected by the optical modulator 165, so the second pixel element 162 appears black to an observer 99. Thus, the display can synthesize red.

In accordance with color theory, various mixtures of red, green, and blue can be used to synthesize a full color spectrum. As an example, temporally mixing the green of FIG. 16D with the red of FIG. 16F can produce orange. As another example, temporally mixing the green of FIG. 16D, the blue of FIG. 16E, and the red of FIG. 16F can also produce white.

The weighted coefficients of the colors or the example embodiments and other suitable embodiments may be optimized to increase resolution and/or to decrease fixed pattern noise. For example, the optical modulator of the first pixel element may be in the first state for 76.3% of the time and in the second state for 23.7% of the time while the optical modulator of the second pixel element is in the first state for 100% of the time. Other proportions are also possible. For another example, the area of the first filter element may have an area smaller than the second filter element (e.g., between about 50% and 75% less than the area of the second filter element). FIG. 12D illustrates an embodiment in which the first set of filter elements 96 are larger than the second set of filter elements 98. Other proportions are also possible.

As described above, LCDs using spatial-temporal color synthesis require blanking fields between illuminant transitions. Displays comprising optical modulators advantageously do not require blanking fields because the reflectance color is controllable at an individual sub-pixel level. For example, one sub-pixel may reflect blue at the same time an adjacent sub-pixel reflects yellow, as opposed to an LCD where adjacent sub-pixels are necessarily illuminated with the same illuminant at one time. Elimination of blanking fields advantageously increases light efficiency and reduces power consumption.

In certain embodiments, the light reflected by the optical modulators comes from an external ambient broadband light source. Examples of ambient broadband light sources include, but are not limited to, sunlight and artificial lighting (e.g., fluorescent or filament light bulbs). In certain embodiments (e.g., the projection display described below), the display comprises a light source or a plurality of light sources. Optical modulator displays utilizing hybrid spatial-temporal color synthesis and comprising light sources may advantageously provide broadband light (e.g., from a metal halide lamp) or narrowband light (e.g., from an LED projection illuminator). In some embodiments, narrowband light sources provide better display color performance (e.g., color saturation, color gamut).

Figure 17:
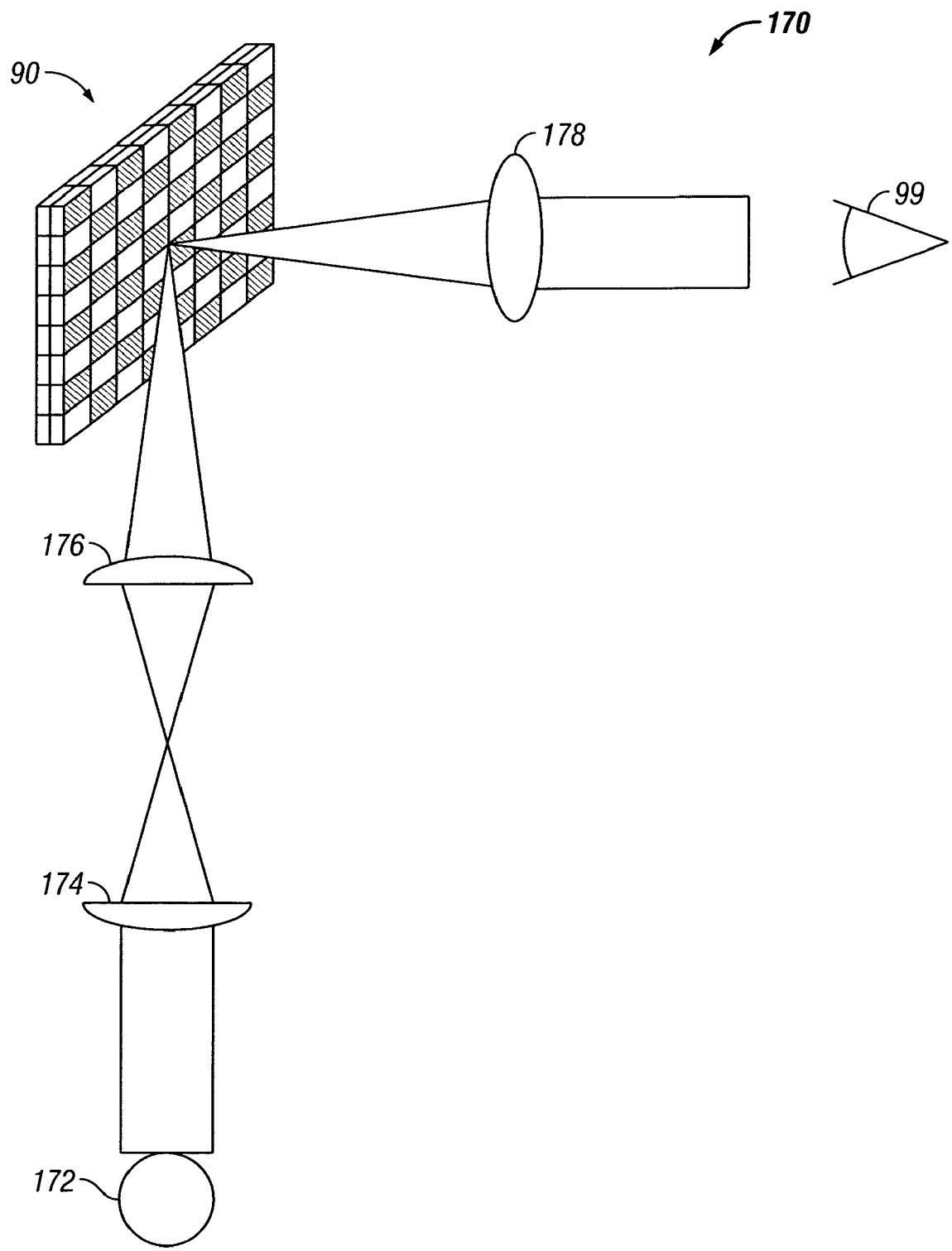
FIG. 17 is a schematic diagram of a projection display comprising a plurality of interferometric modulators and a plurality of filter elements.

The optical modulator displays utilizing hybrid spatial-temporal color synthesis described herein may also be integrated into a projection display. FIG. 17 illustrates a projection display 170 comprising a plurality of optical modulators and a plurality of filter elements similar to the display device 90. The projection display 170 further comprises a lamp 172, a condensing lens 174, a shaping lens 176, and a projection lens 178. As described above, the lamp 172 may comprise a broadband light source (e.g., a metal halide lamp) or a plurality of narrowband light sources (e.g., LEDs). Other light sources are also possible. The lenses 174, 176, 178 may comprise plastic, glass, etc., and are well known in the art. Such a projection display can advantageously eliminate a color wheel disposed between the condensing lens 174 and the shaping lens 176 included in traditional projection displays (e.g., DLP) because the optical modulators can perform color separation (i.e., by reflecting light with different spectral reflectances).

Various specific embodiments have been described above. Although the invention has been described with reference to these specific embodiments, the descriptions are intended to be illustrative of the invention and are not intended to be limiting. Various modifications and applications may occur to those skilled in the art without departing from the true scope of the invention as defined in the appended claims.

What is claimed is:

1. A display device comprising:
    a plurality of optical modulators comprising a first set of optical modulators and a second set of optical modulators, each optical modulator of the plurality of optical modulators configured to be selectively switched among at least a first state, a second state, and a third state, each state having a different spectral reflectance; and
    a plurality of filter elements on a reflective side of the plurality of optical modulators, the plurality of filter elements comprising a first set of filter elements corresponding to the first set of optical modulators and a second set of filter elements corresponding to the second set of optical modulators, the first set of filter elements having a different spectral transmittance than the second set of filter elements.

2. The display device of claim 1, wherein the size and shape of each filter element corresponds to the size and shape of a corresponding optical modulator.

3. The display device of claim 1, wherein the plurality of filter elements forms a checkerboard pattern in which the first set of filter elements alternate with the second set of filter elements in two substantially perpendicular directions.

4. The display device of claim 1, wherein the plurality of filter elements forms a striped pattern in which the first set of filter elements alternate with the second set of filter elements in one direction.

5. The display device of claim 1, wherein a spectral reflectance configuration of the first set of optical modulators is the same as a spectral reflectance configuration of the second set of optical modulators.

6. The display device of claim 1, wherein at least one of the first, second, and third states of the first set of optical modulators has a different spectral reflectance than the first, second, and third states of the second set of optical modulators.

7. The display device of claim 1, wherein the device is configured to produce a color image.

8. The display device of claim 1, wherein the device is configured to produce three primary colors suitable for rendering color images.

9. The display device of claim 1, wherein the first set of filter elements has a spectral transmittance of magenta and the second set of filter elements has a spectral transmittance of cyan.

10. The display device of claim 1, wherein the spectral reflectance of the first state is substantially yellow, the spectral reflectance of the second state is substantially blue, and the spectral reflectance of the third state is substantially black.

11. The display device of claim 1, wherein the first set of filter elements has a spectral transmittance of magenta and the second set of filter elements has a spectral transmittance of green.

12. The display device of claim 11, wherein the first set of filter elements has an area less than an area of the second set of filter elements.

13. The display device of claim 12, wherein the area of the first set of filter elements is between about 50% to 75% less than the area of the second set of filter elements.

14. The display device of claim 1, wherein the spectral reflectance of the first state is substantially yellow, the spectral reflectance of the second state is substantially cyan, and the spectral reflectance of the third state is substantially black.

15. The display device of claim 1, wherein the spectral reflectance of the first state is substantially white, the spectral reflectance of the second state is substantially a narrowband color, and the spectral reflectance of the third state is substantially black.

16. The display device of claim 1, further comprising a light source.

17. The display device of claim 16, wherein the light source comprises a broadband light source.

18. The display device of claim 16, wherein the light source comprises a plurality of narrow band light sources.

19. The display device of claim 1, wherein the plurality of optical modulators are configured to reflect ambient light.

20. A display device comprising:
first means for optically modulating light between at least a first color, a second color, and a third color;
second means for optically modulating light between the first color, the second color, and the third color;
first means for filtering light modulated by the first modulating means; and
second means for filtering light modulated by the second modulating means, wherein the first filtering means has a different spectral transmittance than the second filtering means.

21. The display device of claim 20, wherein the first and second modulating means comprise a plurality of optical modulators, each optical modulator of the plurality of optical modulators configured to be selectively switched to modulate light between the first, second, and third colors.

22. The display device of claim 20, wherein the first filtering means comprises a first set of filter elements corresponding to the first modulating means and the second filtering means comprises a second set of filter elements corresponding to the second modulating means.

23. A method of generating an image, the method comprising:
providing a display device comprising a plurality of optical modulators comprising a first set of optical modulators and a second set of optical modulators, each optical modulator of the plurality of optical modulators configured to be selectively switched among at least a first state, a second state, and a third state, each state having a different spectral reflectance, and a filter on a reflective side of the plurality of optical modulators, the filter comprising a first set of filter elements corresponding to the first set of optical modulators and a second set of filter elements corresponding to the second set of optical modulators, the first set of filter elements having a different spectral transmittance than the second set of filter elements;
directing light from a light source onto the display device; and
selectively switching the plurality of optical modulators between the states.

24. The method of claim 23, wherein the first set of filter elements has a transmission spectrum of magenta and the second set of filter elements has a transmission spectrum of cyan, and wherein the first state has a spectral reflectance of yellow, the second state has a spectral reflectance of blue, and the third state has a spectral reflectance of black.

25. The method of claim 23, wherein the first set of filter elements has a transmission spectrum of magenta and the second set of filter elements has a transmission spectrum of green, and wherein the first state has a spectral reflectance of yellow, the second state has a spectral reflectance of cyan, and the third state has a spectral reflectance of black.

26. The method of claim 23, wherein directing the light comprises directing light from a broadband light source.

27. The method of claim 23, wherein directing the light comprises directing light from a plurality of narrow band light sources.

28. A method of manufacturing a display device, the method comprising:
forming a plurality of optical modulators comprising a first set of optical modulators and a second set of optical modulators, each optical modulator of the plurality of optical modulators configured to be selectively switched among at least a first state, a second state, and a third state, each state having a different spectral reflectance; and
forming a plurality of filter elements on a reflective side of the plurality of optical modulators, the plurality of filter elements comprising a first set of filter elements corresponding to the first set of optical modulators and a second set of filter elements corresponding to the second set of optical modulators, the first set of filter elements having a different spectral transmittance than the second set of filter elements.

29. The method of claim 28, wherein forming the first set of optical modulators comprises a first set of process steps and forming the second set of optical modulators comprises a second set of process steps, the second set of steps comprising the first set of steps.

30. The method of claim 28, wherein forming the plurality of optical modulators comprises depositing a first sacrificial layer having a first thickness and a second sacrificial layer having a second thickness, and wherein the thicknesses of the first and second sacrificial layers determine the spectral reflectance of the first and second states.

31. The method of claim 28, further comprising forming a light source.

32. A display device manufactured by the method of claim 28.

* * * * *

UNITED STATES PATENT AND TRADEMARK OFFICE
CERTIFICATE OF CORRECTION

PATENT NO. : 7,403,180 B1  
APPLICATION NO. : 11/699542  
DATED : July 22, 2008  
INVENTOR(S) : Louis D. Silverstein et al.

It is certified that error appears in the above-identified patent and that said Letters Patent is hereby corrected as shown below:

Title Page; item (73);
At page 1, column 1 (Assignee), line 2, delete "IL" and insert -- CA --, therefor.

At column 18, line 60 (approx.), delete "%." and insert -- $\lambda$. --, therefor.

Signed and Sealed this

Eleventh Day of August, 2009

David J. Kappos
*Director of the United States Patent and Trademark Office*